(12) United States Patent
Togawa

(10) Patent No.: US 7,461,278 B2
(45) Date of Patent: Dec. 2, 2008

(54) POWER CONTROL OF REMOTE APPARATUS VIA NETWORK

(75) Inventor: Yoshifusa Togawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 221 days.

(21) Appl. No.: 10/667,790

(22) Filed: Sep. 23, 2003

(65) Prior Publication Data

US 2005/0204176 A1 Sep. 15, 2005

(51) Int. Cl.
*G06F 1/32* (2006.01)

(52) U.S. Cl. .................. 713/320; 713/300; 713/310; 713/321; 713/322; 713/323; 713/324; 713/330; 713/340

(58) Field of Classification Search ......... 713/320–324, 713/300, 310, 330, 340
See application file for complete search history.

(56) References Cited

U.S. PATENT DOCUMENTS

| | | | |
|---|---|---|---|
| 5,481,733 A | 1/1996 | Douglis et al. | |
| 5,493,670 A | 2/1996 | Douglis et al. | |
| 5,652,892 A | 7/1997 | Ugajin | |
| 5,666,538 A | 9/1997 | DeNicola | |
| 5,708,820 A | 1/1998 | Park et al. | |
| 5,815,652 A * | 9/1998 | Ote et al. | 714/31 |
| 5,937,201 A | 8/1999 | Matsushita et al. | |
| 5,949,974 A | 9/1999 | Ewing | |
| 6,032,224 A * | 2/2000 | Blumenau | 711/117 |
| 6,044,476 A | 3/2000 | Ote | |
| 6,122,746 A | 9/2000 | Nouri et al. | |
| 6,134,668 A | 10/2000 | Sheikh et al. | |
| 6,408,395 B1 | 6/2002 | Sugahara | |
| 6,732,241 B2 * | 5/2004 | Riedel | 711/154 |

FOREIGN PATENT DOCUMENTS

| | | |
|---|---|---|
| JP | 5-73448 | 3/1993 |
| JP | 05150868 A | 6/1993 |
| JP | 5-189094 | 7/1993 |
| JP | 5-224782 | 9/1993 |
| JP | 5-297986 | 11/1993 |
| JP | 7-64742 | 3/1995 |
| JP | 07-134628 | 5/1995 |
| JP | 7-295689 | 11/1995 |
| JP | 8-87383 | 4/1996 |
| JP | 8-314588 | 11/1996 |
| JP | 10-133783 | 5/1998 |

(Continued)

OTHER PUBLICATIONS

U.S. Appl. No. 09/120,337, filed Jul. 22, 1998, Yasuo Sugahara et al., Fujitsu Limited.

(Continued)

*Primary Examiner*—Nitin C. Patel
*Assistant Examiner*—Fahmida Rahman
(74) *Attorney, Agent, or Firm*—Staas & Halsey LLP

(57) ABSTRACT

A power consumption control method for collectively controlling the power consumption of electronic apparatuses connected to a network is provided. When an electronic apparatus is connected to the network, a management device performs power-saving control for the electronic apparatus. When the electronic apparatus is disconnected from the network, the electronic apparatus performs the power-saving control for itself. Thus, the power consumption of the clients connected to the network can be effectively reduced.

5 Claims, 44 Drawing Sheets

FOREIGN PATENT DOCUMENTS

| | | |
|---|---|---|
| JP | 10-312370 | 11/1998 |
| JP | 11-53068 | 2/1999 |

OTHER PUBLICATIONS

Office Action mailed from the Japanese Patent Office on Dec. 4, 2007.

Translation of Office Action mailed from the Japanese Patent Office on Feb. 27, 2007 (non-translated version submitted with IDS filed on may 25, 2007).

Nikkei Electronics, 1991 (newly submitted partial translation).

Translation of Japanese Office Action in the related Japanese Patent Application mailed on Jun. 10, 2008.

Translation of Office Actin mailed from the Japanese Patent Office on Dec. 4, 2007 (non-translated version submitted with IDS filed on Dec. 20, 2007).

* cited by examiner

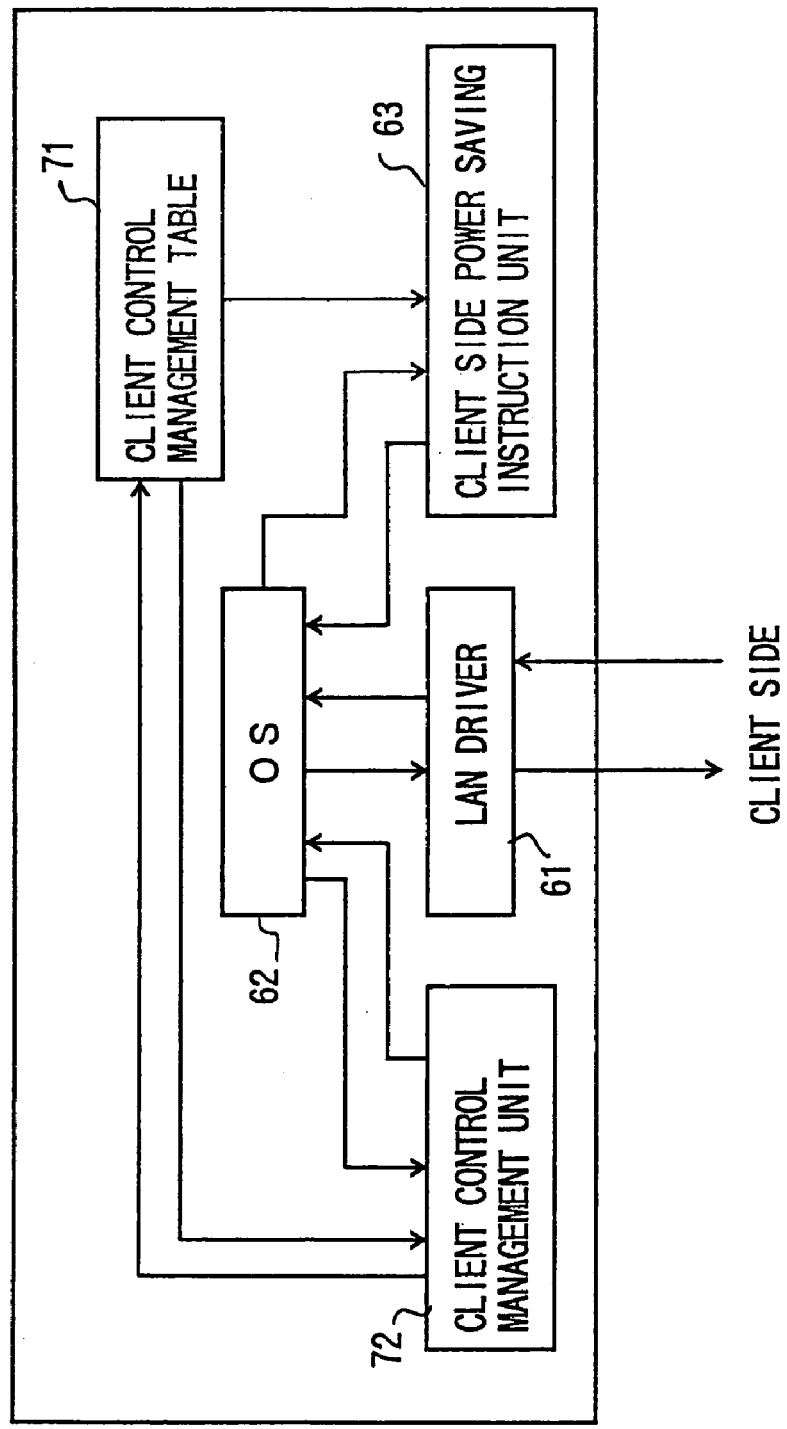

FIG. 13A

CLIENT CONTROL MANAGEMENT TABLE 71

| CONNECTED CLIENT NUMBER | STATUS |
|---|---|
| CLIENT NAME | |
| ... | ... |
| | |
| | |

FIG. 13B

STATUS: SUSPENDED/STAND-BY/HIBERNATION/RESUME OR WAKEUP/CONNECTION START

00001 : CONNECTION START
00010 : SUSPENDED
00100 : STAND-BY
01000 : HIBERNATION
10010 : WAKEUP
10100 : RESUME
11000 : WAKEUP FROM HIBERNATION

FIG. 15

STATUS TABLE 92

| 00001/00010/00100/01000/10010/10100/11000 |

SHARED FILE INFORMATION

| FILE/PRINTER NAME | DRIVE AND PATH NAME |
|---|---|
| . . . . . . . . . | |
| FILE/PRINTER NAME | DRIVE AND PATH NAME |

171     172

F I G. 3 7

CLIENT LOG INFORMATION STORAGE AREA 1 8 2

| CLIENT INFORMATION | DEVICE NAME INFORMATION | FILE/PRINTER NAME INFORMATION | ACCESS TIME |
|---|---|---|---|
| | | | |

CLIENT LOG INFORMATION TABULATION AREA 183

| DEVICE NAME INFORMATION | ACCESS TIME INTERVAL INFORMATION |
|---|---|
|  |  |
|  |  |

| DEVICE NAME INFORMATION | FILE/FOLDER/PRINTER NAME INFORMATION | ACCESS TIME INTERVAL INFORMATION | |
|---|---|---|---|
|  |  |  |  |
|  |  |  |  |

201     203     202

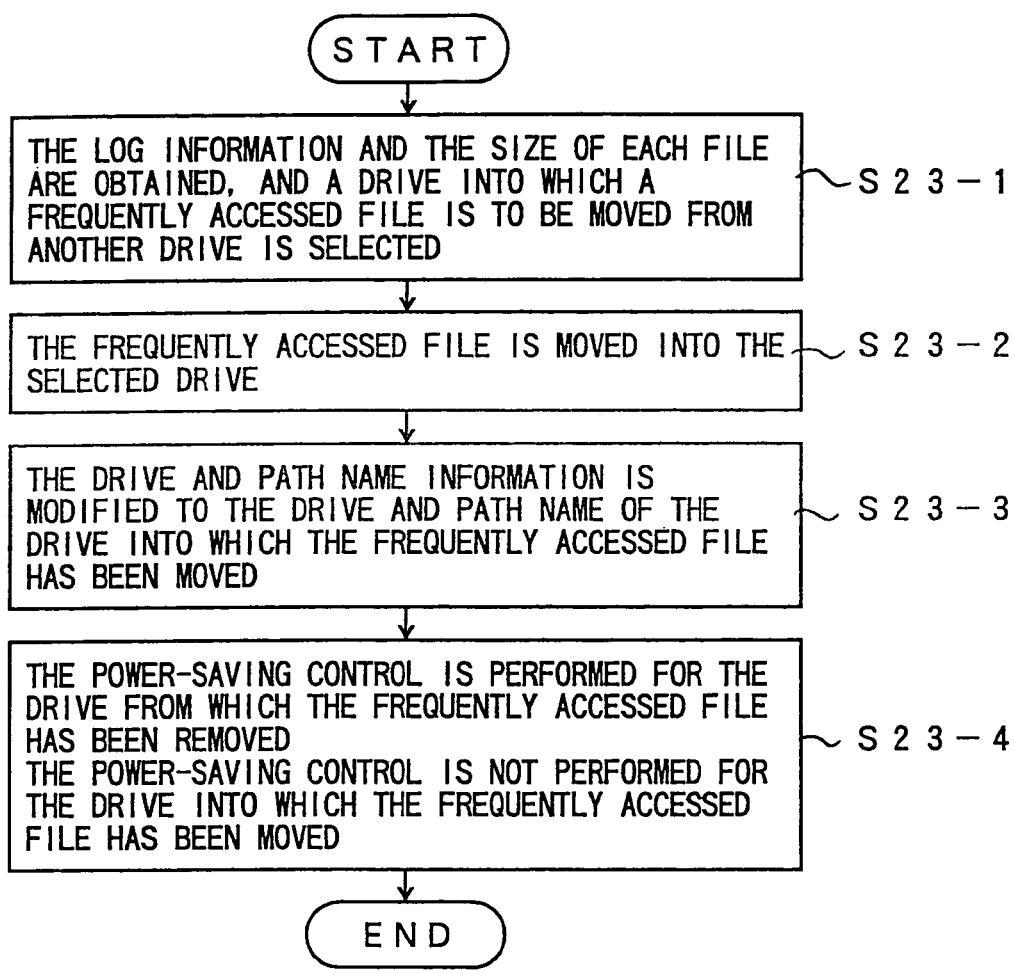

POWER CONTROL OF REMOTE APPARATUS VIA NETWORK

BACKGROUND OF THE INVENTION

1. Field of the Invention

The present invention generally relates to power consumption control methods, electronic apparatuses, management apparatuses, and recording-media. More particularly, the present invention relates to a power consumption control method, in which the power consumption of electronic apparatuses connected to a network is collectively controlled, and also relates to an electronic apparatus, a management apparatus, and a recording medium. Here, the electronic apparatus or the management apparatus is to be communicably "connected" to the network, with an OS (Operating System) operating in a device such as a computer which controls the operation of the electronic apparatus or the management apparatus.

In recent years, as computer systems have been widely used in various fields, the ever-increasing amount of power consumption has become a problem that urgently needs a solution. In a computer system in which a large number of computers are connected to a network, all the computers are not often accessed at once. In this aspect, the power consumption of computers which are not being accessed should be effectively restricted.

2. Description of the Related Art

In a conventional computer system in which a large number of computers are connected to a network, each computer controls the power consumption itself. In such a system, the power-saving control of each computer is performed in accordance with a power-saving program set by each user. When the operation mode of one computer switches from a normal operation mode to a power-saving mode, the user manually switches the operation mode to the power-saving mode, or the operation mode automatically switches to the power-saving mode after no access has been made for a predetermined period of time. In such a system, the frequency of power-saving control varies depending on each user of the computers. This often results in an unnecessarily large amount of power consumption of the entire computer system.

Japanese Patent Application No. 10-31361 discloses a method for performing effective power-saving control. In this method, the server transmits a control signal to a client in accordance with a predetermined schedule set in the server, and if certain conditions are satisfied, the client switches to the power-saving mode. However, since all the clients connected to a network perform the power-saving control independently of each other, the frequency of power-saving control varies depending on the user. This causes the problem of inefficient power consumption in the computer system.

SUMMARY OF THE INVENTION

A general object of the present invention is to provide a power consumption control method, an electronic apparatus, a management apparatus, and a recording medium, in which the above disadvantages are eliminated.

A more specific object of the present invention is to provide a power consumption control method, an electronic apparatus, a management apparatus, and a recording medium, in which the power consumption of the clients connected to a network can be effectively controlled.

The above objects of the present invention are achieved by a method in which power-saving control is performed for an electronic apparatus in accordance with a power-saving control program set in a management apparatus when the electronic apparatus is connected to a network, and the power-saving control is performed for the electronic apparatus in accordance with a power-saving control program set in the electronic apparatus when the electronic apparatus is disconnected from the network.

According to the present invention, it is also possible to determine whether the power-saving control is to be performed by the management apparatus or the electronic apparatus when the electronic apparatus is connected to the network. The management apparatus of the present invention inquires of the electronic apparatus whether the power-saving control for the electronic apparatus should be performed or not, and in accordance with a response from the electronic apparatus to the inquiry, the management apparatus performs the power-saving control for the electronic apparatus.

In the method of the present invention, the usage status of a common apparatus shared by a plurality of electronic apparatuses connected via the network is detected, and the operation of the common apparatus is controlled in accordance with the detected usage status of the common apparatus.

According to the present invention, the power-control is performed by the management apparatus when the electronic apparatus is connected to the network. In this manner, the power consumption of the electronic apparatuses connected to the network can be collectively controlled by the management apparatus, thereby realizing an effective power-saving control operation.

In the present invention, it is also possible to determine whether the power-saving control should be performed by the management apparatus or the electronic apparatus in accordance with information set in the electronic apparatus. Thus, power-saving control suitable for various conditions can be performed. Furthermore, since the operation of the common apparatus is controlled in accordance with the usage status of the common apparatus, the management apparatus can perform effective power-saving control in accordance with the usage status of the common apparatus.

The above and other objects and features of the present invention will become more apparent from the following description taken in conjunction with the accompanying drawings.

BRIEF DESCRIPTION OF THE DRAWINGS

FIG. 12 is a functional block diagram of the server performing the power-saving control for the clients;

FIG. 13A shows the data structure of a client control management table of the server;

FIG. 13B shows the data structure of status information of the server;

FIG. 15 shows the data structure of a status table of a client of this embodiment;

FIG. 33 shows the data structure of the shared file of the present invention;

FIG. 37 shows the data structure of a client LOG information storage area of the present invention;

FIGS. 38A and 38B show example data structures of a client LOG information tabulation area of the present invention;

FIG. 41 is a flowchart of a file moving operation of the server of the present invention;

DESCRIPTION OF THE PREFERRED EMBODIMENTS

Figure 1:
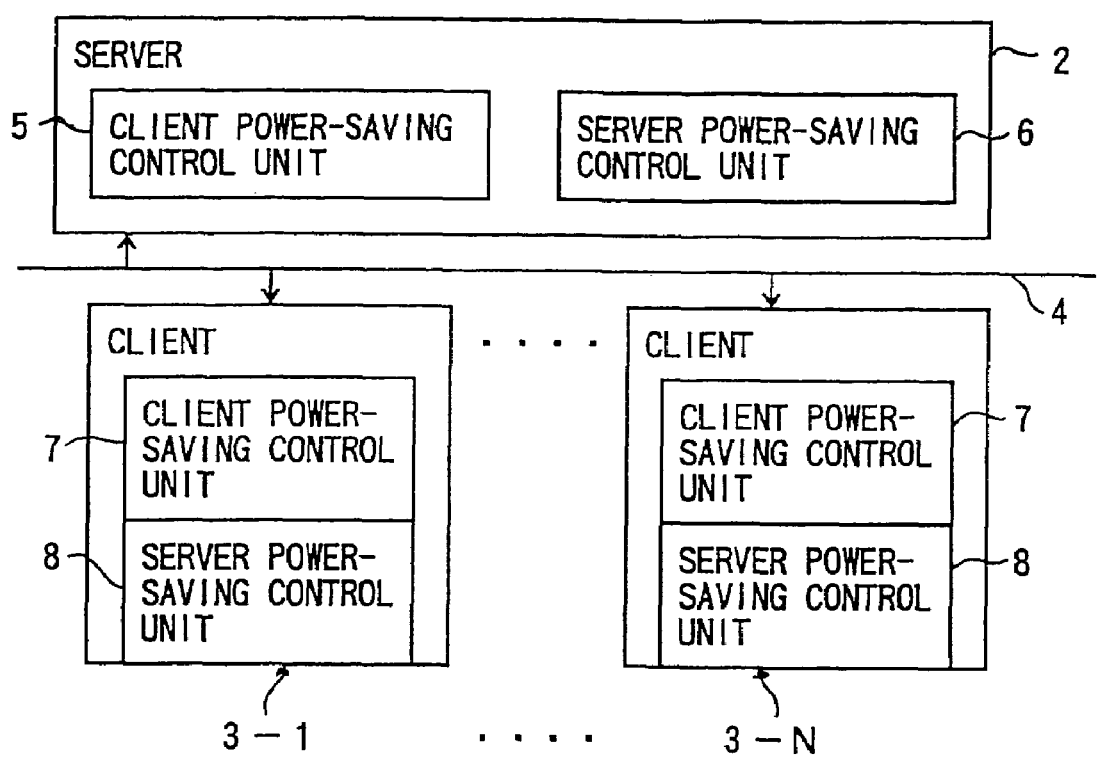
FIG. 1 is a block diagram of one embodiment of the present invention.

FIG. 1 is a block diagram of one embodiment of the present invention.

In an information system 1 of the present invention, a server 2 and clients 3-1 to 3-N are connected via a network 4 such as a LAN. The server 2 includes a client power-saving control unit 5 and a server power-saving control unit 6. The client power-saving control unit 5 collectively performs power-saving control for the clients 3-1 to 3-N connected to the server 2 via the network 4. The server power-saving control unit 6 performs the power-saving control for itself.

It should be understood here that a connected state of the clients 3-1 to 3-N is a state in which operating systems (OS) controlling the respective clients 3-1 to 3-N are on. On the other hand, a cut-off state of the clients 3-1 to 3-N is a state in which the operating systems (OS) controlling the clients 3-1 to 3-N are off or are physically cut off the network 4, and the network 4 cannot control the clients 3-1 to 3-N.

The clients 3-1 to 3-N each include a client power-saving control unit 7 and a server power-saving control unit 8. Each client power-saving control unit 7 performs the power-saving control for each corresponding client based on a power-saving program set in each of the clients 3-1 to 3-N in advance. Each server power-saving control unit 8 controls the power-saving for each corresponding client based on the power-saving program set in the client power-saving control unit 5 of the server 2 in advance.

Figure 2:
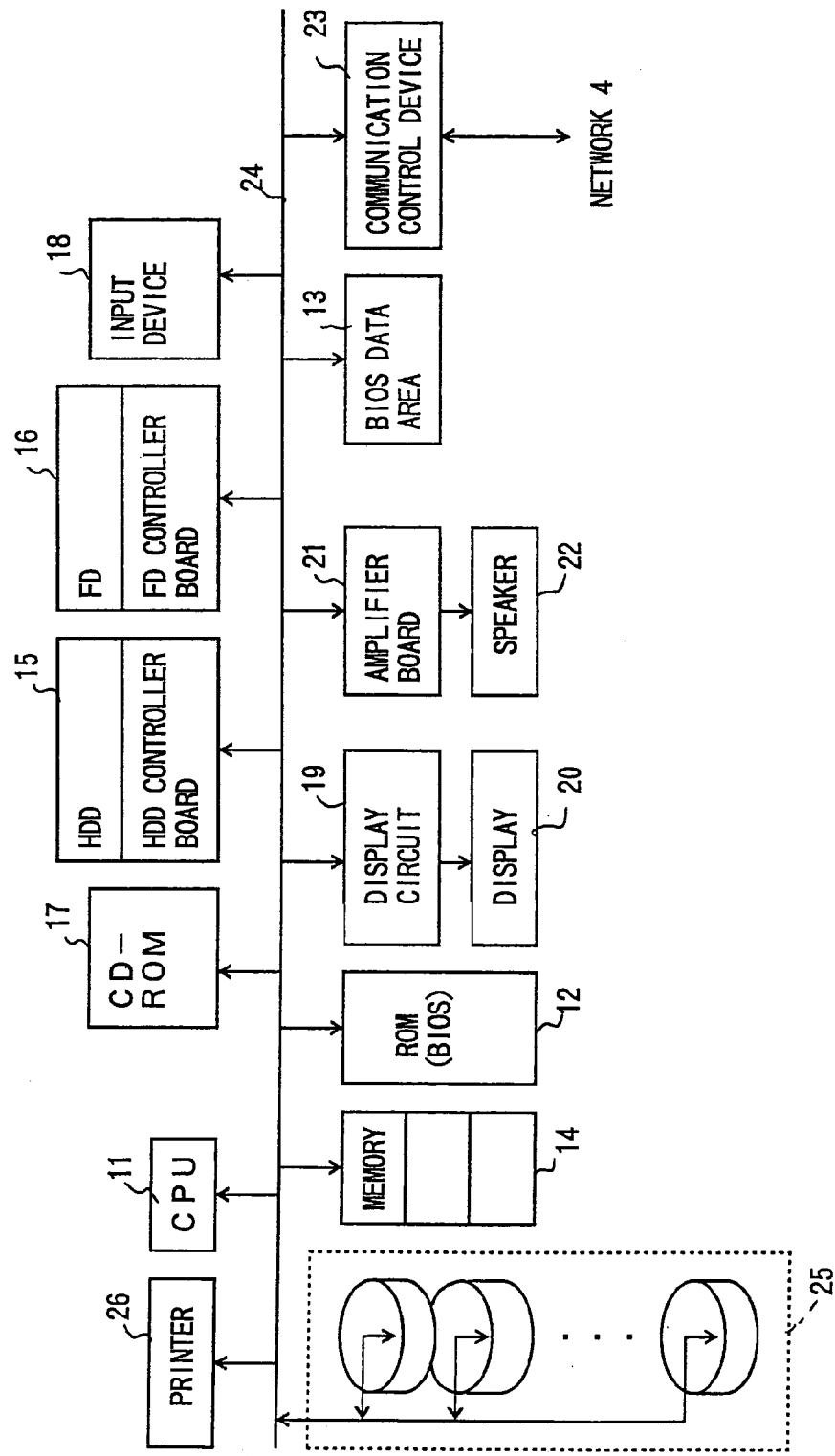
FIG. 2 is a block diagram of a server of the embodiment of the present invention.

FIG. 2 is a block diagram of the server of the embodiment of the present invention.

The server 2 comprises a CPU 11, a ROM 12, a basic input/output system (BIOS) data area 13, a memory 14, a hard disk drive 15, a floppy disk drive 16, a CD-ROM drive 17, an input device 18, a display circuit 19, a display 20, an amplifier board 21, a speaker 22, a communication control device 23, a bus 24, a shared hard disk drive 25, and a shared printer 26.

The CPU 11 performs power-saving control in accordance with a program that is stored in advance. The ROM 12 stores a BIOS to be used for starting the server 2. The BIOS data area 13 stores information for determining whether the power-saving control should be performed or not. The memory 14 is used as a work area for the CPU 11. The hard disk drive 15 stores Various programs to be carried out by the server 2. The floppy disk drive 16 is used as an external storage device of the server 2. The CD-ROM drive 17 is used to read programs and data stored in a CD-ROM. The input device 18 includes a keyboard, a mouse, and others, and is operated by an operator to input instructions and data. The display circuit 19 is disposed between the display 20 and the bus 24, and controls the display 20 based on data supplied from the CPU 11 via the bus 24. The display 20 is a CRT or the like, and displays data processed by the CPU 11 under the control of the display circuit 19. The amplifier board 21 is disposed between the speaker 22 and the bus 24, and supplies audio signals to the speaker 22 based on the data supplied from the CPU 11 via the bus 24. The speaker 22 performs audio output in accordance with the audio signals supplied from the amplifier board 21. The communication control device 23 is disposed between the network 4 and the bus 24, and controls communication between the server 2 and the network 4. The shared hard disk drive 25 and the shared printer 26 are shared among the clients 3-1 to 3-N through the network 4.

The server 2 monitors the conditions of devices such as the hard disk drive 15, the floppy disk drive 16, and the amplifier board 21, and controls power supply to these devices.

Figure 3:
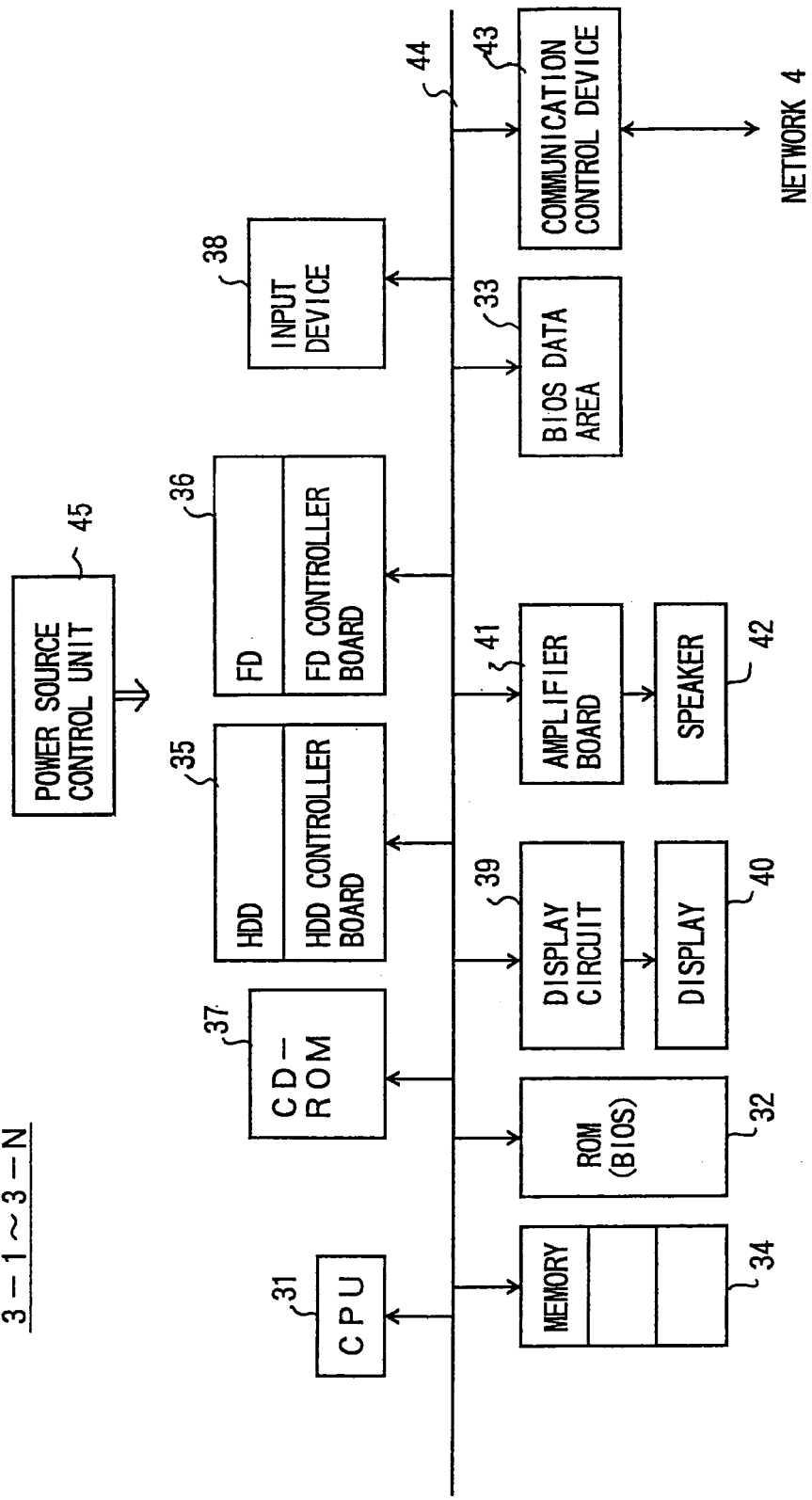
FIG. 3 is a block diagram of a client of the embodiment of the present invention.

FIG. 3 is a block diagram of one of the clients 3-1 to 3-N of the embodiment of the present invention.

Each of the clients 3-1 to 3-N comprises a CPU 31, a ROM 32, a BIOS data area 33, a memory 34, a hard disk drive 35, a floppy disk drive 36, a CD-ROM drive 37, an input device 38, a display circuit 39, a display 40, an amplifier board 41, a speaker 42, a communication control device 43, a bus 44, and a power source control unit 45.

The CPU 31 performs power-saving control in accordance with a program that is stored in advance. The ROM 32 stores a BIOS to be used for starting each of the clients 3-1 to 3-N. The BIOS data area 33 stores information for determining whether the power-saving control should be performed or not. The memory 34 is used as a work area for the CPU 31. The hard disk drive 35 stores various programs to be carried out by the server 2. The floppy disk drive 36 is used as an external storage device of the clients 3-1 to 3-N. The CD-ROM drive 37 is used to read programs and data stored in a CD-ROM. The input device 38 includes a keyboard, a mouse, and others, and is operated by an operator to input instructions and data. The display circuit 39 is disposed between the display 40 and the bus 44, and controls the display of the display 40 based on data supplied from the CPU 31 via the bus 44. The display 40 is a CRT or the like, and displays data processed by the CPU 31 under the control of the display circuit 39. The amplifier board 41 is disposed between the speaker 42 and the bus 44, and supplies audio signals to the speaker 42 based on the data supplied from the CPU 31 via the bus 44. The speaker 42 performs audio output in accordance with the audio signals supplied from the amplifier board 41. The communication control device 43 is disposed between the network 4 and the bus 44, and controls communication between the network 4 and each of the clients 3-1 to 3-N. The power source control unit 45 performs control such as switching on and off the power source or suspending/resuming.

Each of the clients 3-1 to 3-N monitors the conditions of devices such as the hard disk drive 35, the floppy disk drive 36, and the amplifier board 41, and controls power supply to these devices.

Figure 4:
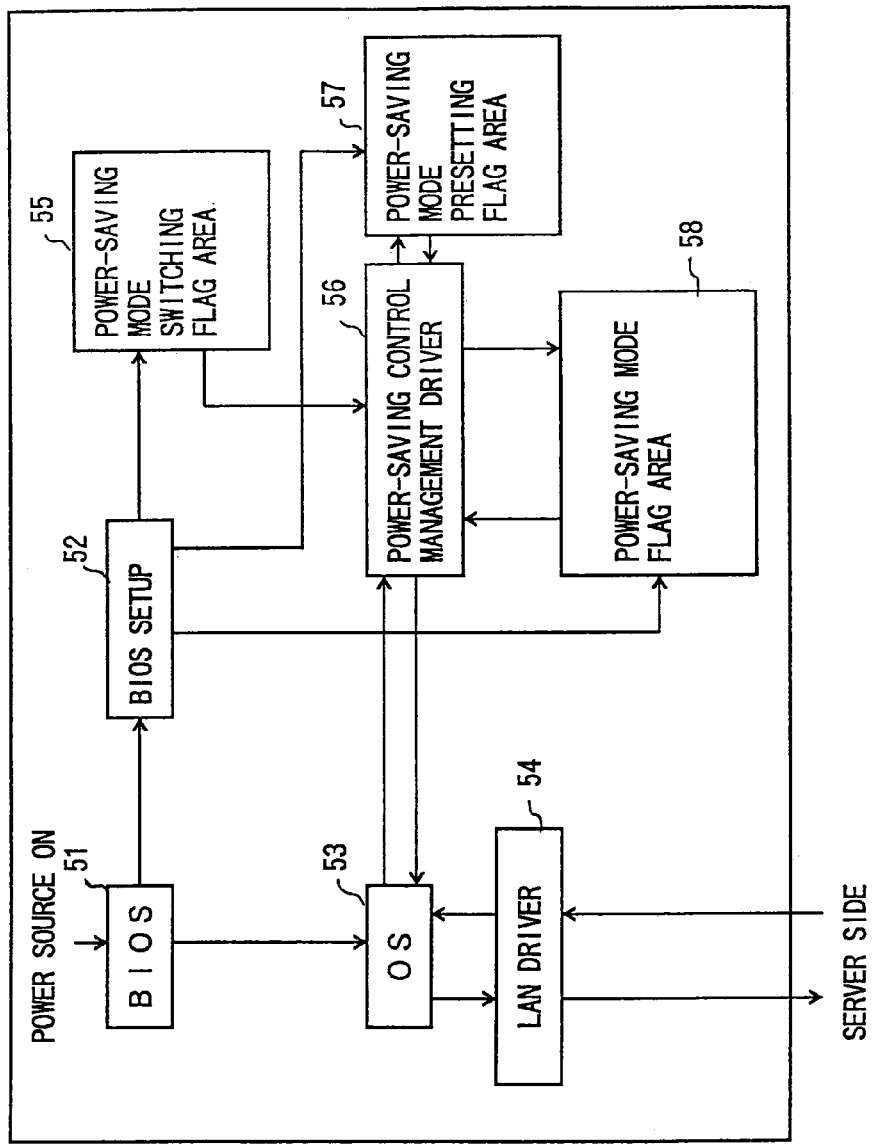
FIG. 4 is a functional block diagram of a power-saving mode switching operation of the client of the embodiment of the present invention.

FIG. 4 is a functional block diagram of a power-saving mode switching operation of the clients of the embodiment of the present invention.

The function blocks for performing the power-saving mode switching operation include a BIOS 51, a BIOS setup 52, an operating system (OS) 53, a LAN driver 54, a power-saving mode switching flag area 55, a power-saving control management driver 56, a power-saving mode presetting flag area 57, and a power-saving flag area 58.

The BIOS 51 is started at the time of switching on the power source, and the BIOS 51 starts the BIOS SETUP 52. Before the start-up of the OS 53, the BIOS SETUP 52 writes the information indicating whether the power-saving control should be performed or not, and supplies the information to the power-saving control driver 56 from the power-saving flag area 58. The BIOS setup 52 is started by handling the function key of the input device 38 at a time of operating the BIOS 51. The BIOS setup 52 provides the power-saving mode switching flag area 55 with the information indicating whether the power-saving control should be performed or not.

In the power-saving mode switching flag area 55, whether the power-saving control should be performed by the server 2 or not is set in accordance with an operation of the input device 38. When the power-saving mode switching flag is "1" the power-saving control is performed by the server 2. When the power-saving mode switching flag is "0", the power-saving control is not performed by the server 2.

The power-saving control management driver 56 determines whether the power-saving control should be performed or not in accordance with the power-saving mode switching flag set in the power-saving mode switching flag area 55 and the flag set in the power-saving mode presetting flag area 57.

The power-saving mode switching flag area 55, the power-saving mode presetting flag area 57, and the power-saving mode flag area 58 are contained in the BIOS data area 33.

The power-saving control management driver 56 instructs the OS 53 that the power-saving control should be performed by the server 2, when the flag stored in the power-saving mode switching flag area 55 is "1". When the flag stored in the power-saving mode switching flag area 55 is "0", the power-saving control management driver 56 controls the OS 53 to perform the power-saving control in accordance with the power-saving information stored in the BIOS data area 33.

The OS 53 supplied with the power-saving information from the power-saving control management driver 56 performs power-saving control for the hard disk drive 35, the floppy disk drive 36, the amplifier board 41, and the like in accordance with the power-saving information preset in the OS 53 itself. When the power-saving control management driver 56 issues an instruction to perform the power-saving control by the server 2, the OS 53 performs the power-saving control for the hard disk drive 35, the floppy disk drive 36, the amplifier board 41, and the like in accordance with the power-saving information supplied from the server 2 via the LAN driver 54.

Figure 5:
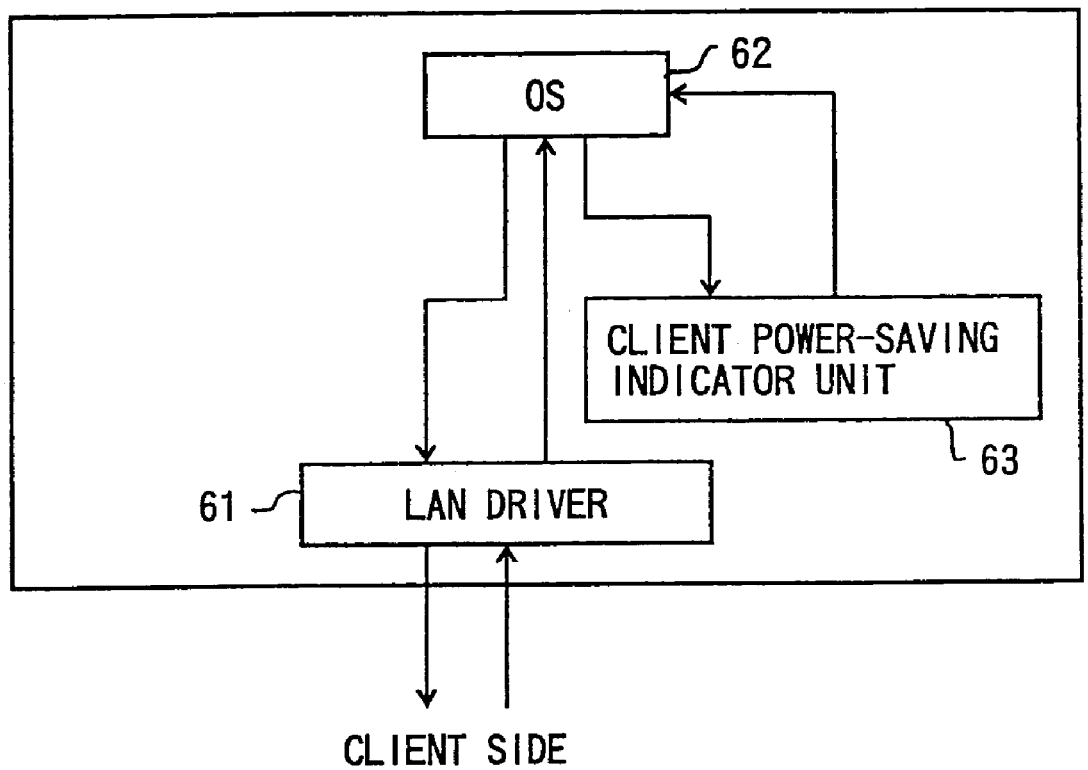
FIG. 5 is a functional block diagram of a power-saving mode switching operation of the server of the embodiment of the present invention.

FIG. 5 is a functional block diagram of a power-saving mode switching operation of the server of the embodiment of the present invention.

The function blocks of the power-saving mode switching operation of the server 2 include a LAN driver 61, an OS 62, and a client power-saving instruction unit 63.

The LAN driver 61 receives a connection notice from the clients 3-1 to 3-N. The LAN driver 61 then sends the connection notice to the OS. The OS 62 then issues a power-saving instruction to the client power-saving instruction unit 63. In accordance with the power-saving instruction from the OS 62, the client power-saving instruction unit 63 sends power-saving instruction information to the clients 3-1 to 3-N via the OS 62 and the LAN driver 61.

Figure 6:
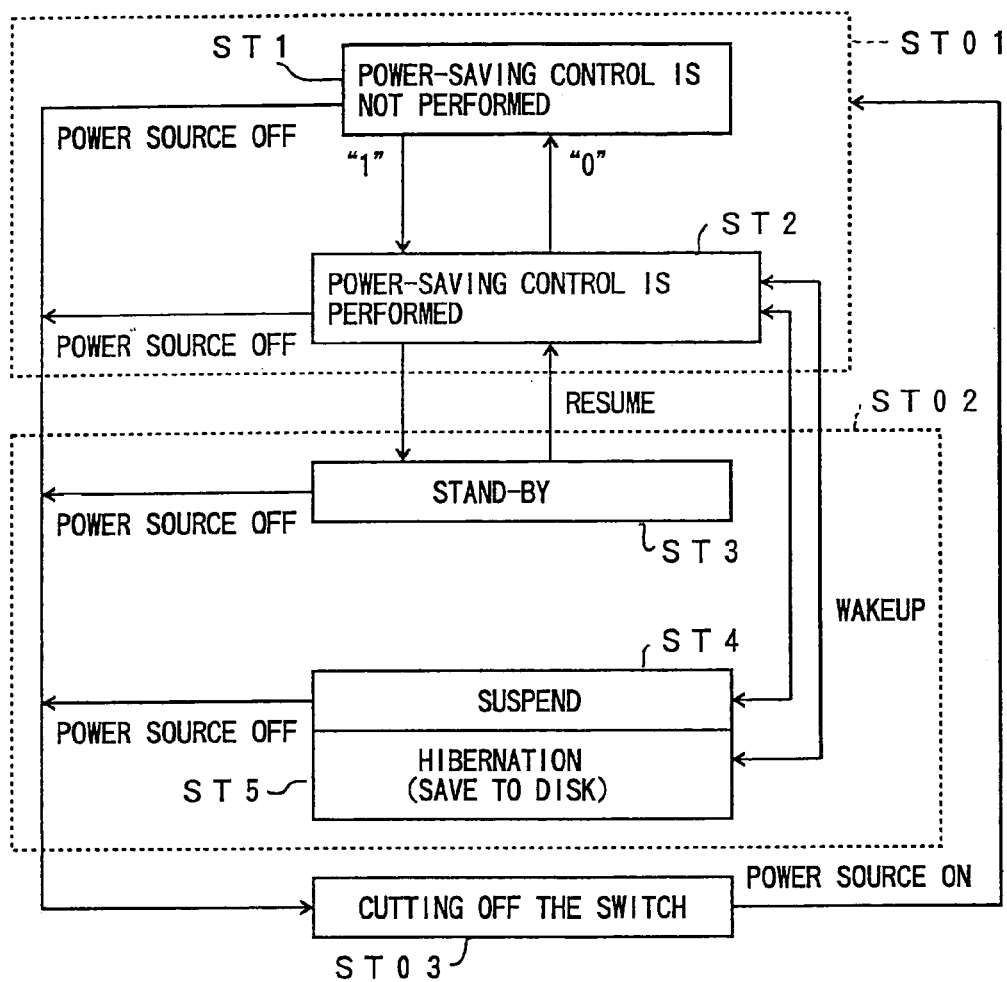
FIG. 6 is a state transition diagram of the client of the embodiment of the present invention.

FIG. 6 is a state transition diagram of each of the clients of the embodiment of the present invention.

The operation states of a client 3-$i$ ($i$=1 to N) include a normal operation state ST01, a power-saving mode ST02, and a power-off state ST03. The normal operation state ST01 comprises setting states ST1 and ST2. In the setting state ST1, the power-saving control is not performed. If no operation is performed in the setting state ST2 within a predetermined period of time, the operation state of the client 3-$i$ moves into the power-saving mode ST02.

The power-saving mode ST02 comprises a stand-by state ST3, a suspended state ST4, and a hibernation state ST5.

In the stand-by state ST3, the power supply for a predetermined device, for instance, the hard disk drive 35, is cut off, and the clock operation frequency for the CPU 31 is lowered. In the suspended state ST4, the power supply for a predetermined device, for instance, the hard disk drive 35, is cut off, and the clock supply for the CPU 31 is stopped, thereby stopping the operation of the CPU 31. In the hibernation state ST5, all the current information is stored in the hard disk drive 35 for restoring the same state, and the power source is then switched off.

In the power-off state ST03, the power source is switched off.

If a flag indicating whether the power-saving control is necessary is set at "1" in the BIOS data area 33, the client 3-i operates in the setting state ST2. If the flag is set at "0", the client 3-i operates in the setting state ST1. If there is no operation from the input device 38 in the setting state ST2 within a predetermined period of time, the power-saving control is performed in accordance with the power-saving information stored in the BIOS data area 33.

If there is no operation from the input device 38 within a predetermined period of time with the power-saving information in the BIOS data area 33 including information for transition to the stand-by state ST3, the client 3-i moves into the stand-by state ST3.

If there is no operation from the input device 38 within a predetermined period of time with the power-saving information in the BIOS data area 33 including information for transition to the suspended state ST4, the client 3-i moves into the suspended state ST4.

If there is no operation from the input device 38 within a predetermined period of time with the power-saving information in the BIOS data area 33 including information for transition to the hibernation state ST5, the client 3-i moves into the hibernation state ST5.

If there is an operation from the input device 38 in the power-saving mode ST02, the client 3-i returns to the setting state ST2.

Figure 7A:
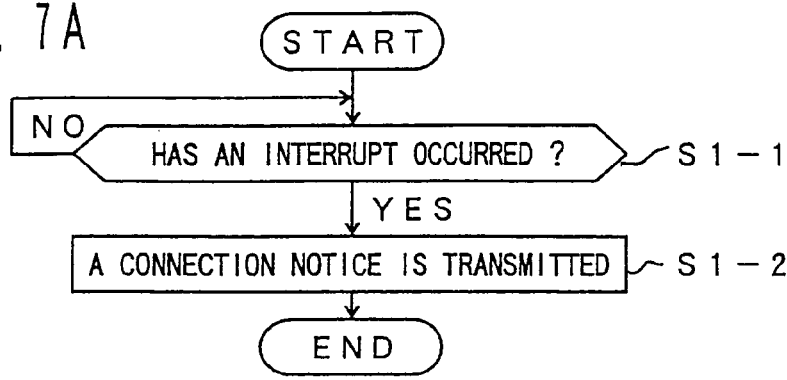
FIGS. 7A to 7C are operation flowcharts of a LAN driver of the client of the embodiment of the present invention.
Figure 7B:
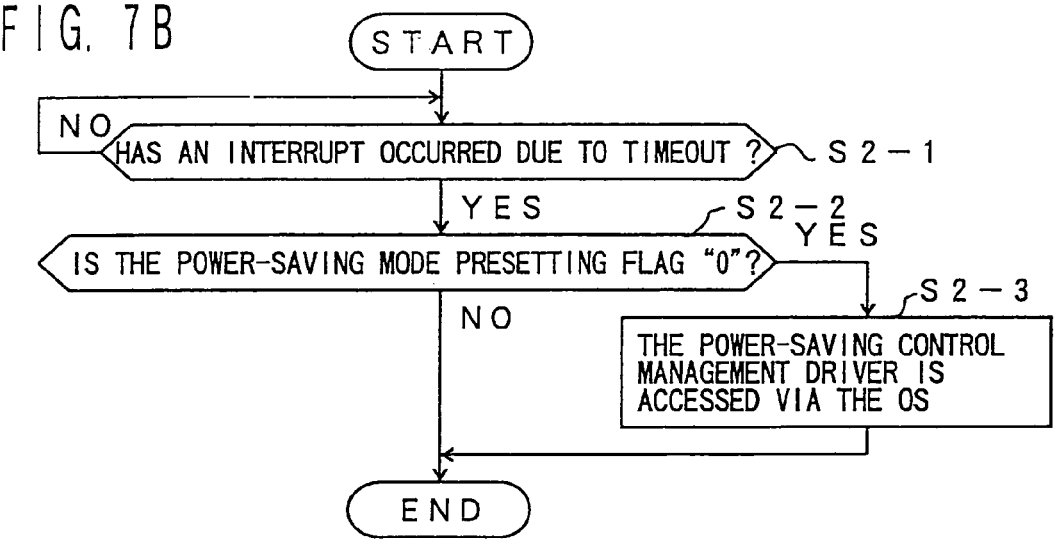
Figure 7C:
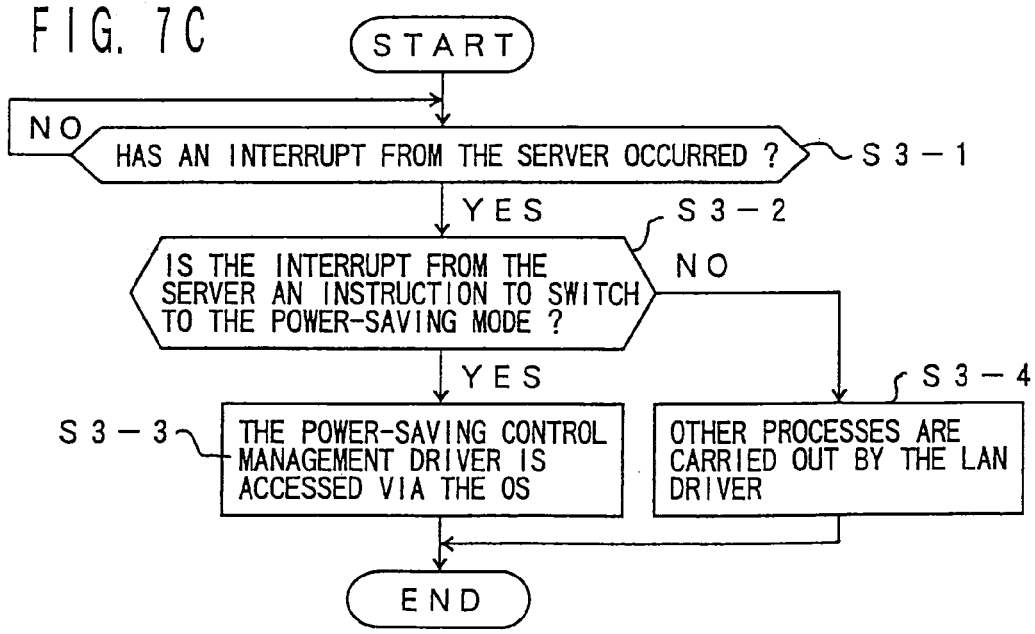

Referring now to FIGS. 7A to 7C, the operation performed by the LAN driver 54 will be described. FIGS. 7A to 7C are flowcharts of the power-saving switching operation by the LAN driver of each client of the embodiment of the present invention.

As shown in FIG. 7A, in step S1-1, the LAN driver 54 of a client 3-i judges whether an interrupt has occurred. If an interrupt is detected in step S1-1, the LAN driver 54 transmits a connection notice to the server 2 in step S1-2.

As shown in FIG. 7B, in step S2-1, the LAN driver 54 judges whether a timer interrupt has occurred due to time-out of an internal timer, and in step S2-2, the LAN driver 54 judges whether the flag in the power-saving mode presetting flag area 57 is "1" or "0". If the flag in the power-saving mode presetting flag area 57 is "1", the client 3-i performs the power-saving control, and the operation comes to an end. If the flag in the power-saving mode presetting flag area 57 is "0", the server 2 performs the power-saving control, and the LAN driver 54 accesses the power-saving control management driver 56 via the OS 53 in step S2-3.

As shown in FIG. 7C, in step S3-1, the LAN driver 54 judges whether an interrupt from the server 2 has occurred or not. In step S3-2, the LAN driver 54 judges whether the interrupt from the server 2 is an instruction to switch to the power-saving mode or not. If the interrupt from the server 2 is judged to be an instruction to switch to the power-saving mode, the LAN driver 54 accesses the power-saving control management driver 56 via the OS 53 in step S3-3. If the interrupt from the server 2 is not an instruction to switch to the power-saving mode, the LAN driver 54 carries out other processes in accordance with other instructions in step S3-4.

Figure 8:
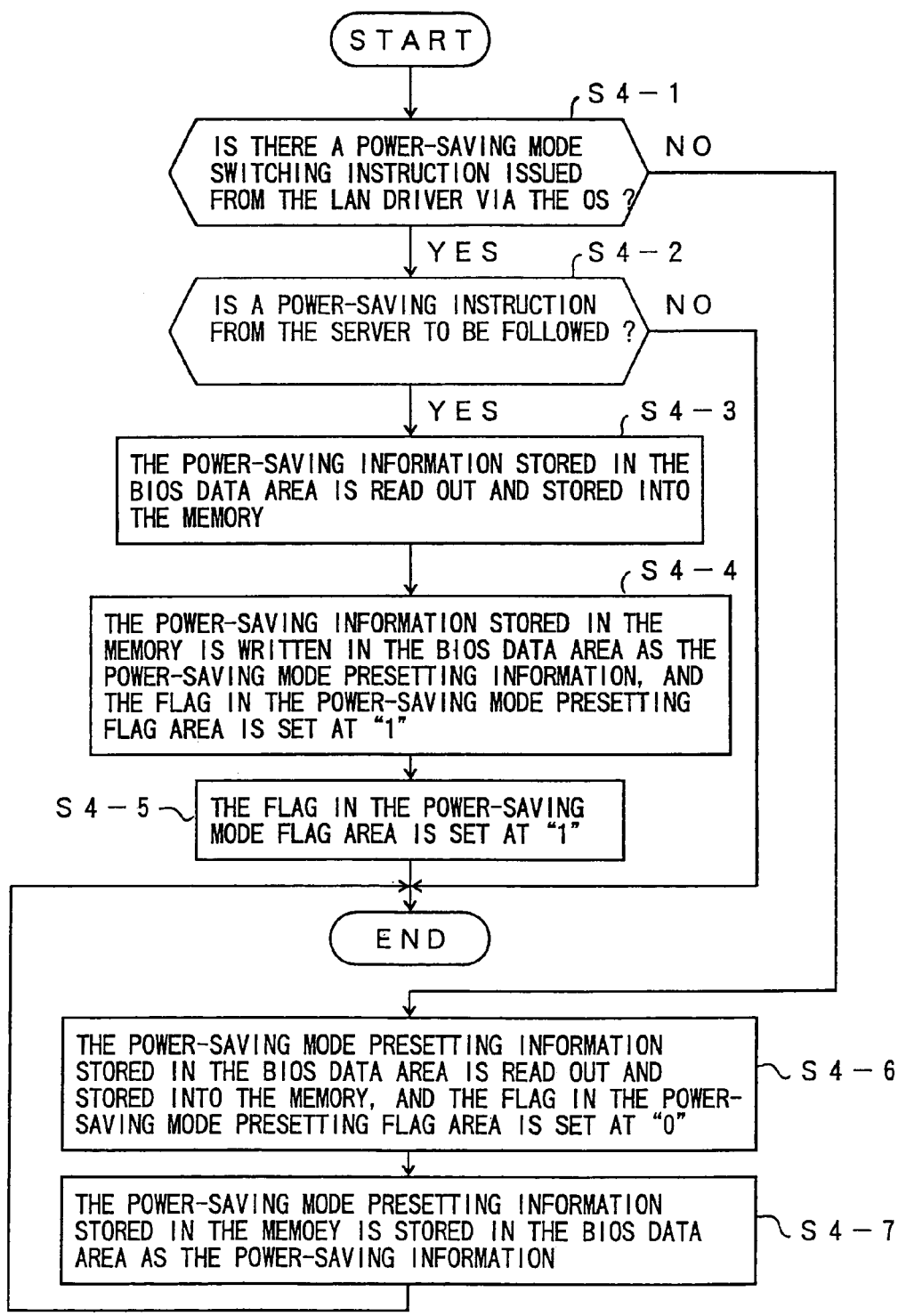
FIG. 8 is an operation flowchart of a power-saving control management driver of the client of the embodiment of the present invention.

Referring now to FIG. 8, the operation performed by the power-saving control management driver 56 accessed in steps S2-3 and S3-3 will be described below. FIG. 8 is a flowchart of the power-saving control management driver of each client of the embodiment of the present invention.

In step S4-1 in the flowchart, the power-saving control management driver 56 analyzes a notice supplied from the LAN driver 54, and judges whether the notice is a power-saving mode switching instruction or not. If the notice is judged to be a power-saving mode switching instruction in step S4-1, the power-saving control management driver 56 judges whether to follow the power-saving mode switching instruction from the server 2 in step S4-2. This judgment is made in accordance with the flag set in the power-saving mode switching flag area 55.

If the power-saving mode switching instruction from the server 2 is to be followed, the power-saving control management driver 56 reads out the power-saving information from the BIOS data area 33, and stores it into the memory 34 in step S4-3.

In step S4-4, the power-saving control management driver 56 writes the stored power-saving information in a predetermined region in the BIOS data area 33, and then sets the flag in the power-saving mode presetting flag area 57 at "1".

The power-saving control management driver 56 sets the flag in the power-saving mode flag area 58 at "1" in step S4-5.

If the notice from the server 2 is judged not to be a power-saving mode switching instruction in step S4-1, the power-saving control management driver 56 reads out the power-saving mode presetting information from the BIOS data area 33 into the memory 34, and sets the flag in the power-saving mode presetting flag area 57 at "0" in step S4-6.

In step S4-7, the power-saving control management driver 56 reads out the power-saving mode presetting information from the memory 34, and stores it as the power-saving information into the BIOS data area 33.

Figure 9:
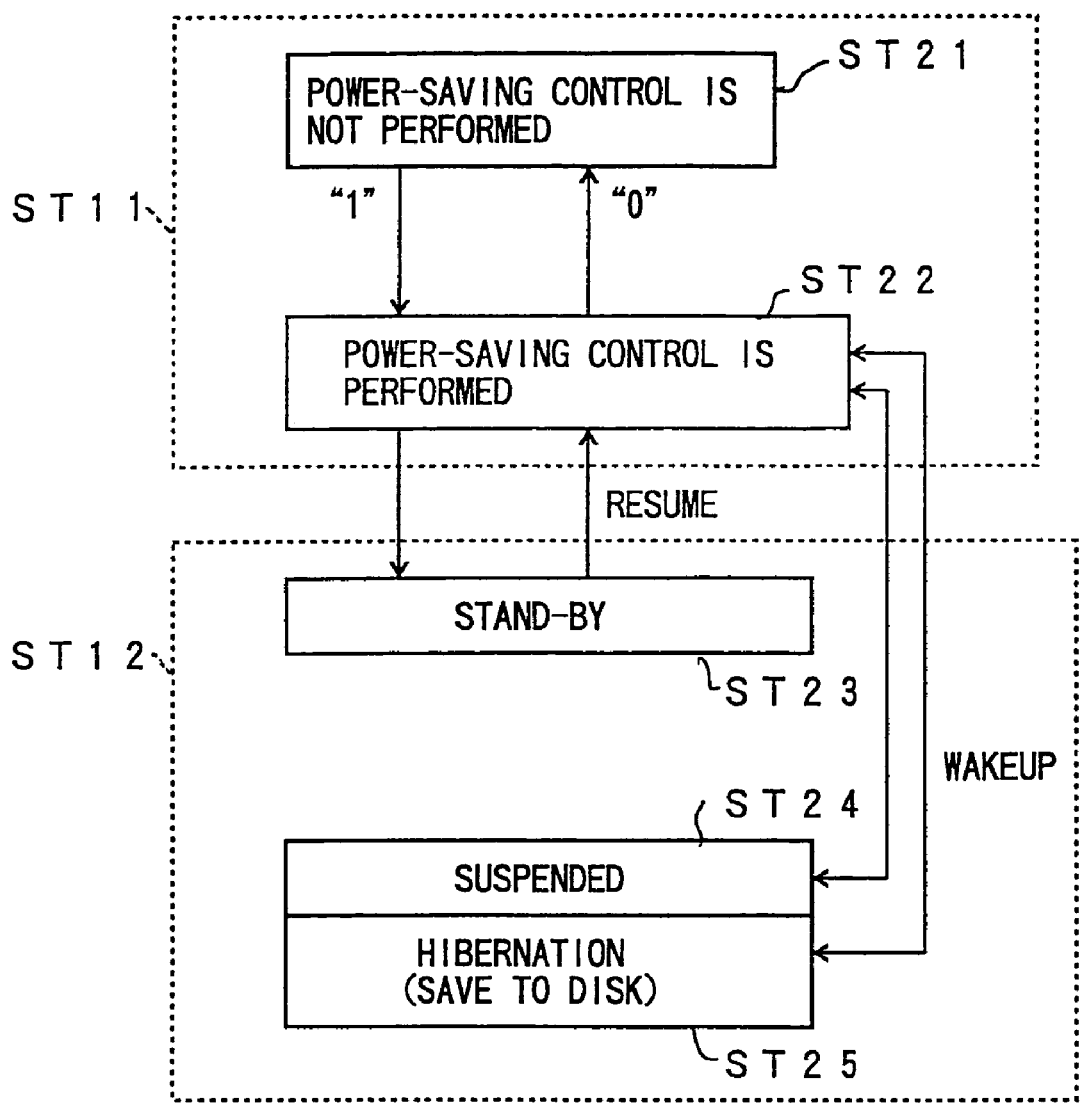
FIG. 9 is a state transition diagram of the server of the embodiment of the present invention.

FIG. 9 is a state transition diagram of the client 3-i with the server of the embodiment of the present invention.

The operation states of the server 2 include a normal operation state ST11 and a power-saving mode ST12. The normal operation state ST11 comprises setting states ST21 and ST22. In the setting state ST21, even if there is no operation from the input device 38 such as the keyboard within a predetermined period of time, the power-saving control is not performed.

In the setting state ST22, the operation moves into the power-saving mode ST12 if there is no operation from the input device 38 within a predetermined period of time.

The power-saving mode ST12 comprises a stand-by state ST23, a suspended state ST24, and a hibernation state ST25.

In the stand-by state ST23, the power source is cut off for a predetermined device, such as the hard disk drive 35, and the clock operation frequency for the CPU 11 is reduced.

In the suspended state ST24, the power source is cut off for a predetermined device, such as the hard disk drive 3, and the clock supply to the CPI 11 is stopped, so that the operation of the CPU 11 can be stopped.

In the hibernation state ST25, necessary information for restoring the foregoing state is stored in the hard disk drive 15, and the power source is then cut off.

If the flag indicating whether the power-saving control is necessary is set at "1" in the BIOS data area 13, the server 2 operates in the setting state ST22. If the flag is set at "0", the server 2 operates in the setting state ST21. In the setting state ST22, if no notice is sent from a client 3-i within a predetermined period of time, the power-saving control is performed in accordance with the power-saving information stored in the BIOS data area 13.

If there is no notice from the client 3-*i* within a predetermined period of time, with the power-saving information including the information for transition to the stand-by state ST23, the server 2 moves into the stand-by state ST23.

If there is no notice from the client 3-*i* within a predetermined period of time, with the power-saving information including the information for transition to the suspended state ST24, the server 2 moves into the suspended state ST24.

If there is no notice from the client 3-*i* within a predetermined period of time, with the power-saving information including the information for transition to the hibernation state ST25, the server 2 moves into the hibernation state ST25.

If there is a notice from the client 3-*i* in the power-saving mode ST12 including the stand-by state ST23, the suspended state ST24, and the hibernation state ST25, the server 2 returns to the setting state ST22.

Figure 10:
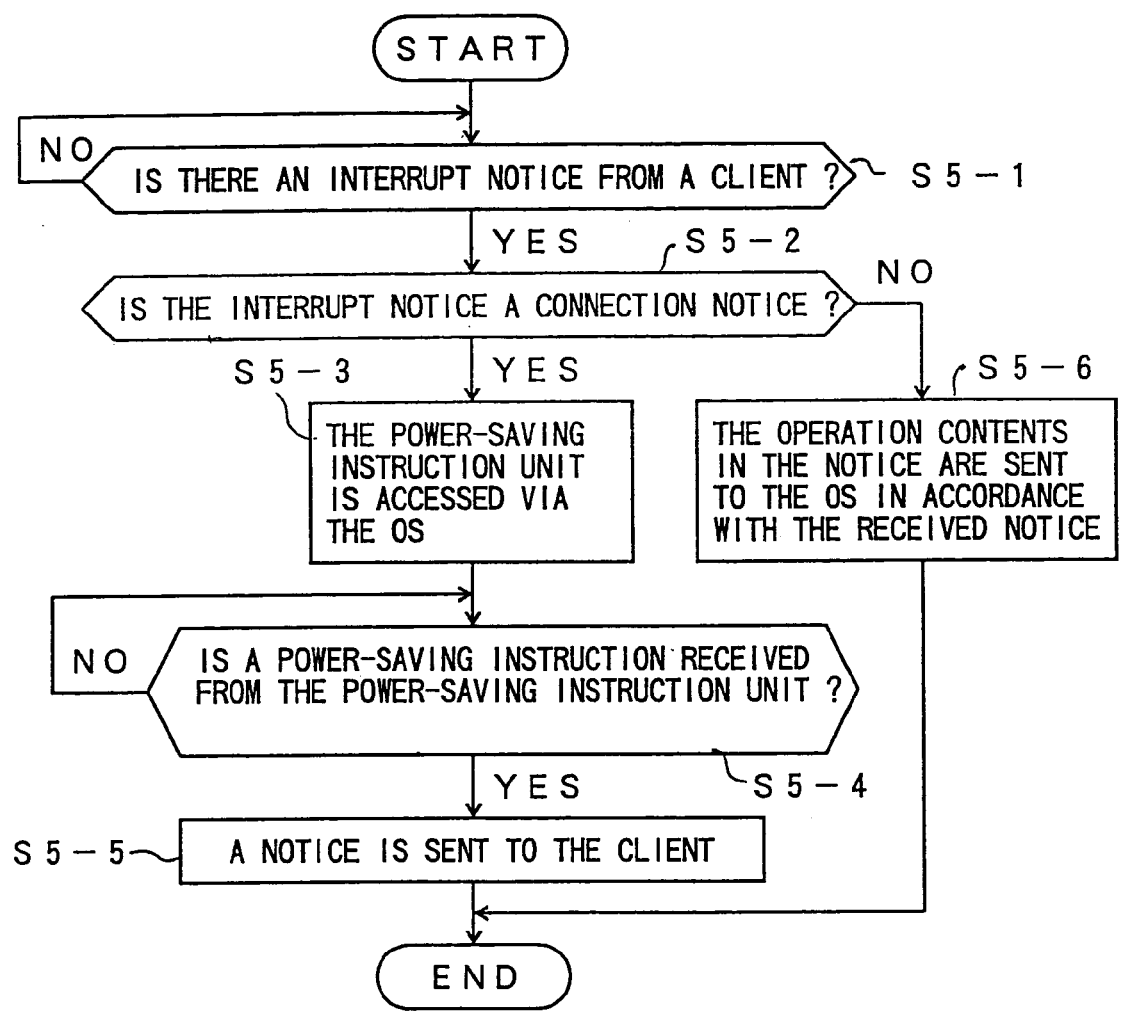
FIG. 10 is an operation flowchart of a LAN driver of the server of the embodiment of the present invention.

FIG. 10 is a flowchart of an operation performed by the LAN driver of the server of the embodiment of the present invention.

The LAN driver 61 of the server 2 judges whether there is an interrupt notice from the client 3-*i* in step S5-1. If an interrupt notice from the client 3-*i* is recognized via the network 4, the LAN driver 61 judges whether the interrupt is a connection notice or not in step 5-2.

If the interrupt notice from the client 3-*i* is judged to be a connection notice in step S5-2, the LAN driver 61 accesses the client power-saving instruction unit 63 via the OS 62 in step 5-3. The LAN driver 61 then waits for a power-saving instruction to be issued from the client power-saving instruction unit 63 in step S5-4.

If a power-saving instruction is issued from the client power-saving instruction unit 63 in step S5-4, the LAN driver 61 transmits the power-saving instruction to the client 3-*i* via the network 4 in step S5-5.

If the interrupt notice from the client 3-*i* is judged to be not a connection notice in step S5-2, the LAN driver 61 sends the OS 62 operation contents corresponding to the received notice in step S5-6.

Figure 11:
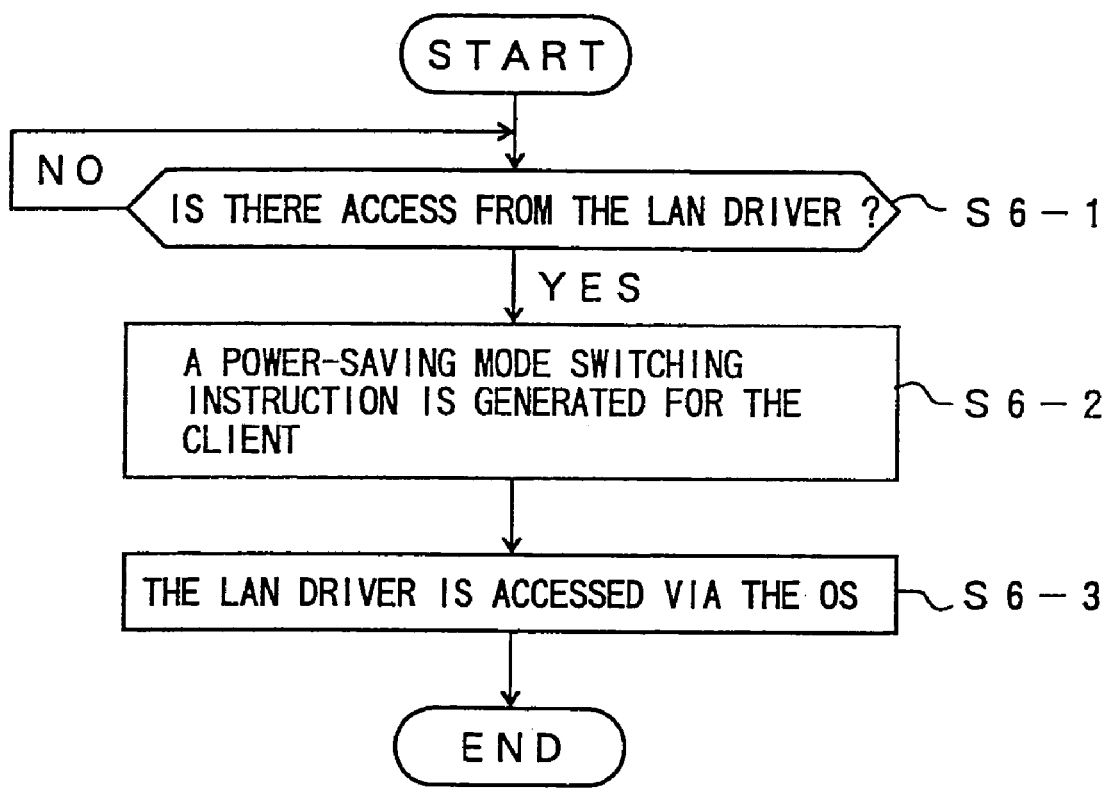
FIG. 11 is a flowchart of an operation performed by a power-saving instruction unit of the server of the embodiment of the present invention.

FIG. 11 is a flowchart of an operation performed by the power-saving instruction unit of the server of the embodiment of the present invention.

The client power-saving instruction unit 63 judges whether the LAN driver 61 has accessed the client power-saving instruction unit 63 or not in step S6-1. If the LAN driver 61 accessed the client power-saving instruction unit 63 via the OS 62, the client power-saving instruction unit 63 generates a switch instruction for switching the client 3-*i* to the power-saving mode in step S6-2. After the generation of the switch instruction, the client power-saving instruction unit 63 accesses the LAN driver 61 via the OS 62, and supplies the power-saving instruction to the LAN driver 61 in step 6-3.

In the above-described manner, the power-saving mode setting for each of the clients 3-*i* is carried out.

FIG. 12 is a functional block diagram of the server performing the power-saving control for the clients. In this figure, the same components as in FIG. 5 are indicated by the same reference numerals.

To perform the power-saving control, the server 2 is provided with a client control management table 71 and a client control management unit 72. The client control management table 71 stores the current state of each client. The client control management unit 72 performs the power-saving control of the client 3-*i* in accordance with the client control management table 71.

FIG. 13A shows the data structure of the client control management table of the server, and FIG. 13B shows the data structure of the status information.

The client control management table 71 contains connected client number information 81, client name information 82, and status information 83.

The connected client number information 81 contains the number of clients 3-1 to 3-N currently connected to the network 4. In other words, the number of clients that have transmitted a connection notice is stored. The client name information 82 contains the names of the clients. The status information 83 contains information indicating the state, such as the suspended state, the stand-by state, the hibernation state, the resume state, the wakeup state, or the connection start state. For instance, the status information is "00001" in the connection start state, "00010" in the suspended state, "00100" in the stand-by state, "01000" in the hibernation state, "10010" in the wakeup state, "10100" in the resume state, and "11000" during the transition from the hibernation state to the wakeup state.

Figure 14:
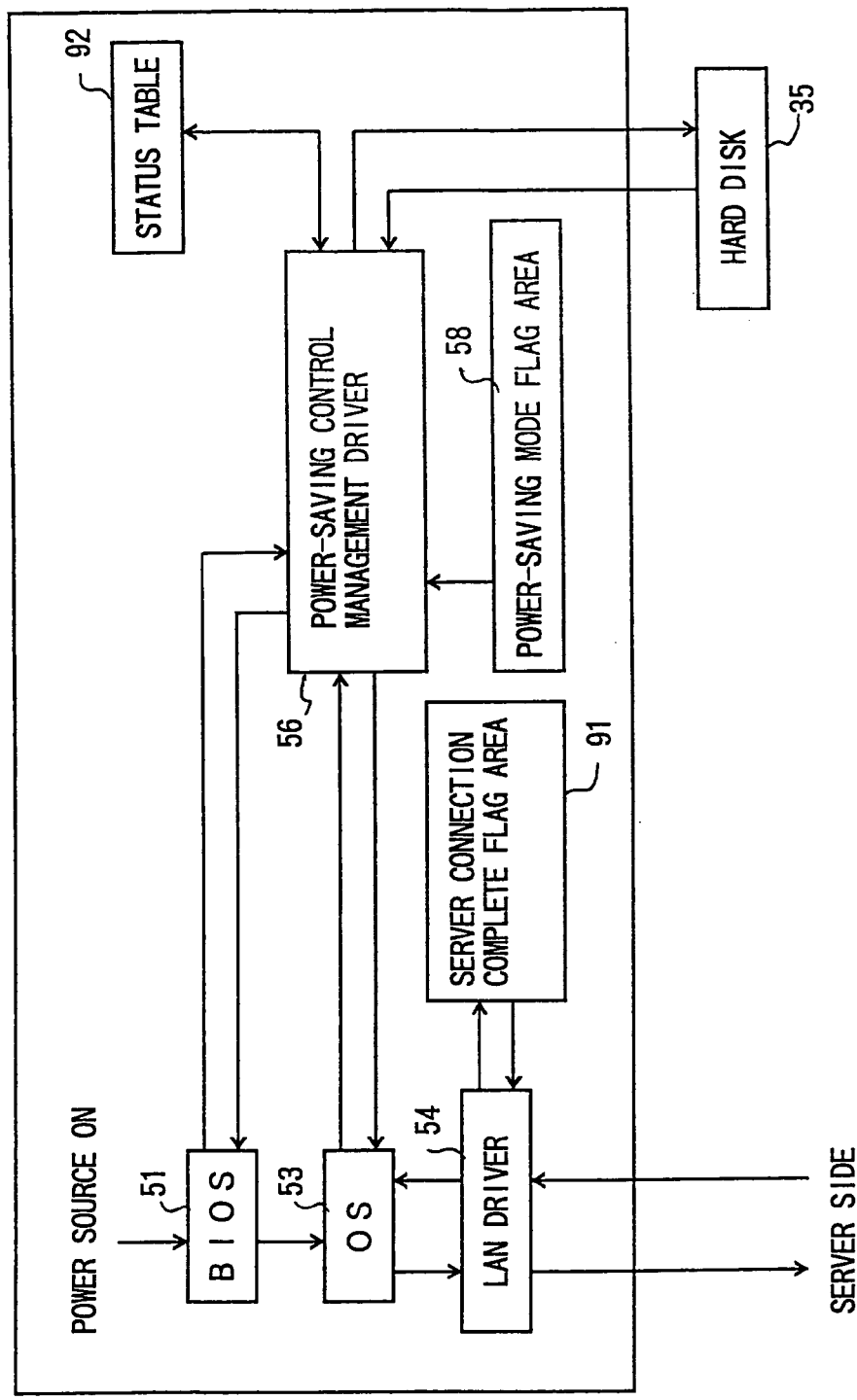
FIG. 14 is a functional block diagram of a client for which the power-saving control is performed by the server.

FIG. 14 is a functional block diagram of a client for which the power-saving control is performed by the server. In this figure, the same components as in FIG. 4 are indicated by the same reference numerals.

The client 3-*i* comprises a server connection complete flag area 91 and a status table 92. The flag in the server connection complete flag area 91 is set at "1", when the client 3-*i* is connected to the network 4 by the LAN driver 54. The flag in the server connection complete flag area 91 is set at "0" when the client 3-*i* is not connected to the network 4. The status table 92 contains the operation state of the client 3-*i*.

FIG. 15 shows the data structure of the status table of each client of this embodiment. The status table 92 stores information indicating the state of the client 3-*i* such as the suspended state, the stand-by state, the hibernation state, the resume state, the wakeup state, or the connection start state. For instance, the status information is "00001" in the connection start state, "00010" in the suspended state, "00100" in the stand-by state, "01000" in the hibernation state, "10010" in the wakeup state, "10100" in the resume state, and "11000" in the wakeup state from the hibernation state.

Figure 16:
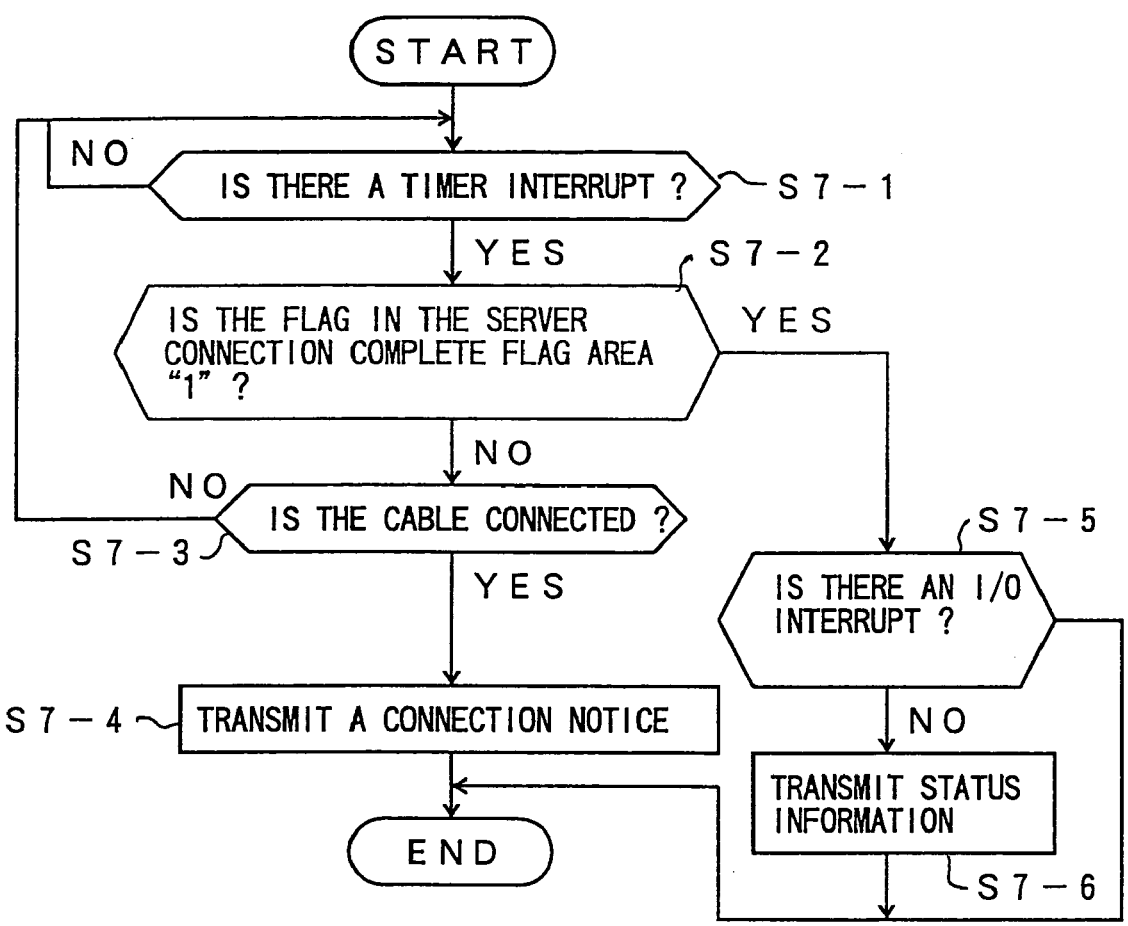
FIG. 16 is a flowchart of the LAN driver of a client when the server performs the power-saving control for the client.

FIG. 16 is a flowchart of the LAN driver 54 of the client 3-*i* when the server 2 performs the power-saving control for the client 3-*i*.

In step S7-1, the LAN driver 54 judges whether there is a timer interrupt from the server 2 or not. If there is an interrupt from the server 2, the LAN driver 54 judges whether the flag in the server connection complete flag area 91 is "1" or not, i.e., whether the connection between the client 3-*i* and the server 2 is complete or not, in step S7-2. A timer interrupt occurs at predetermined intervals. If the flag in the server connection complete flag area 91 is "0", i.e., if the connection between the client 3-*i* and the server 2 is not complete, the LAN driver 54 judges whether the LAN of the client 3-*i* is connected to the network 4 or not in step S7-3.

If the LAN cable connection is confirmed in step S7-3, the LAN driver 54 transmits a connection notice to the server 2 in step S7-4.

If the flag in the server connection complete flag area 91 is "1", i.e., if the connection between the client 3-*i* and the server 2 is complete, the LAN driver 54 judges whether there is an input/output interrupt in step S7-5.

If there is an input/output interrupt in step S7-5, the operation comes to an end. If there is no input/output interrupt in step S7-5, the LAN driver 54 transmits the status information of the client 3-*i* to the server 2 in step S7-6.

Figure 17:
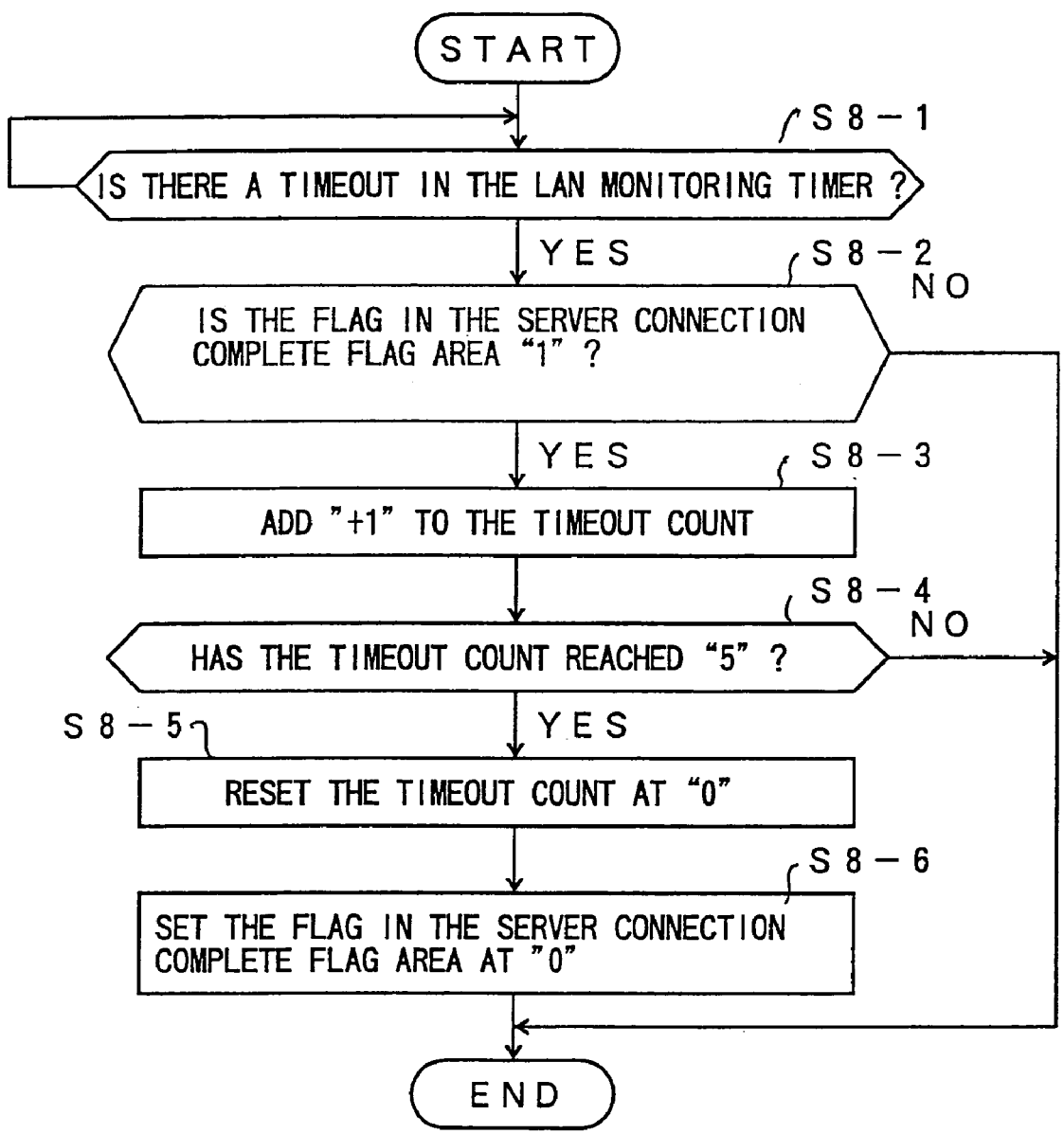
FIG. 17 is a flowchart of a connection monitoring operation of the LAN driver of a client using a LAN monitoring timer.

FIG. 17 is a flowchart of a connection monitoring operation of the LAN driver 54 using the LAN monitoring timer.

In step S8-1, the LAN driver 54 monitors whether there is a timeout in the LAN monitoring timer. If there is a timeout of the LAN monitoring timer, the LAN driver 54 judges whether the flag in the server connection complete flag area is "1" or not, i.e., whether the connection between the client 3-*i* and the server 2 is complete or not in step S8-2.

If the flag in the server connection complete flag area 91 is "0", i.e., if the connection between the client 3-*i* and the server 2 is not complete, the power-saving control is not necessary. Therefore, the operation comes to an end.

If the flag in the server connection complete flag area is "1", i.e., if the client 3-*i* is connected to the server 2, "+1" is added to the timeout count in the LAN monitoring timer in step S8-3.

The LAN driver 54 then judges whether the timeout count reaches a predetermined value, for instance, "5", in step S8-4. In other words, the LAN driver 54 judges whether a timeout by the LAN monitoring timer has occurred 5 times or not.

If the timeout count has not reached "5" in step S8-4, the operation comes to an end. If the timeout count has reached "5" in step S8-4, the timeout count is reset to "0" in step S8-5, and the flag in the server connection complete flag area 91 is set at "0" in step S8-6. The operation then comes to an end. Thus, the client 3-*i* is disconnected from the server 2.

Figure 18:
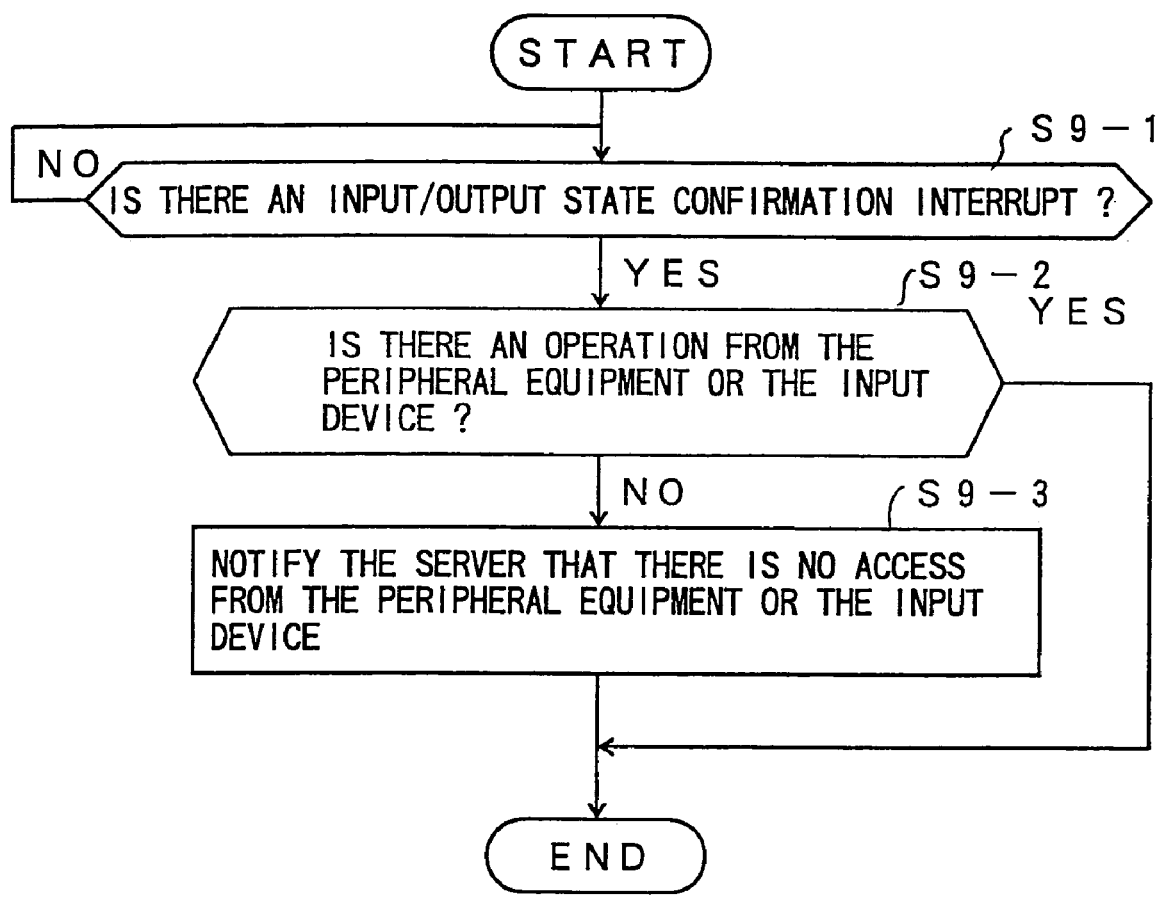
FIG. 18 is a flowchart of an operation of the LAN driver of a client when there is an input/output status confirmation interrupt from the server.

FIG. 18 is a flowchart of an operation of the LAN driver 54 when there is an input/output status confirmation interrupt from the server 2.

In step S9-1, the LAN driver 54 judges whether there is an input/output status conformation interrupt from the server 2. If there is an input/output status confirmation interrupt from the server 2 in step 9-1, the LAN driver 54 judges whether the peripheral equipment such as the hard disk drive 35 or the input device 38 such as a keyboard is operated or not in step S9-2.

If there is an operation from the peripheral equipment or the input device 38 in step S9-2, the operation comes to an end. If there is no operation from the peripheral equipment or the input device 38 in step S9-2, the LAN driver 54 notifies the server 2 that there is no access to the peripheral equipment or the input device 38 in step S9-3.

Figure 19:
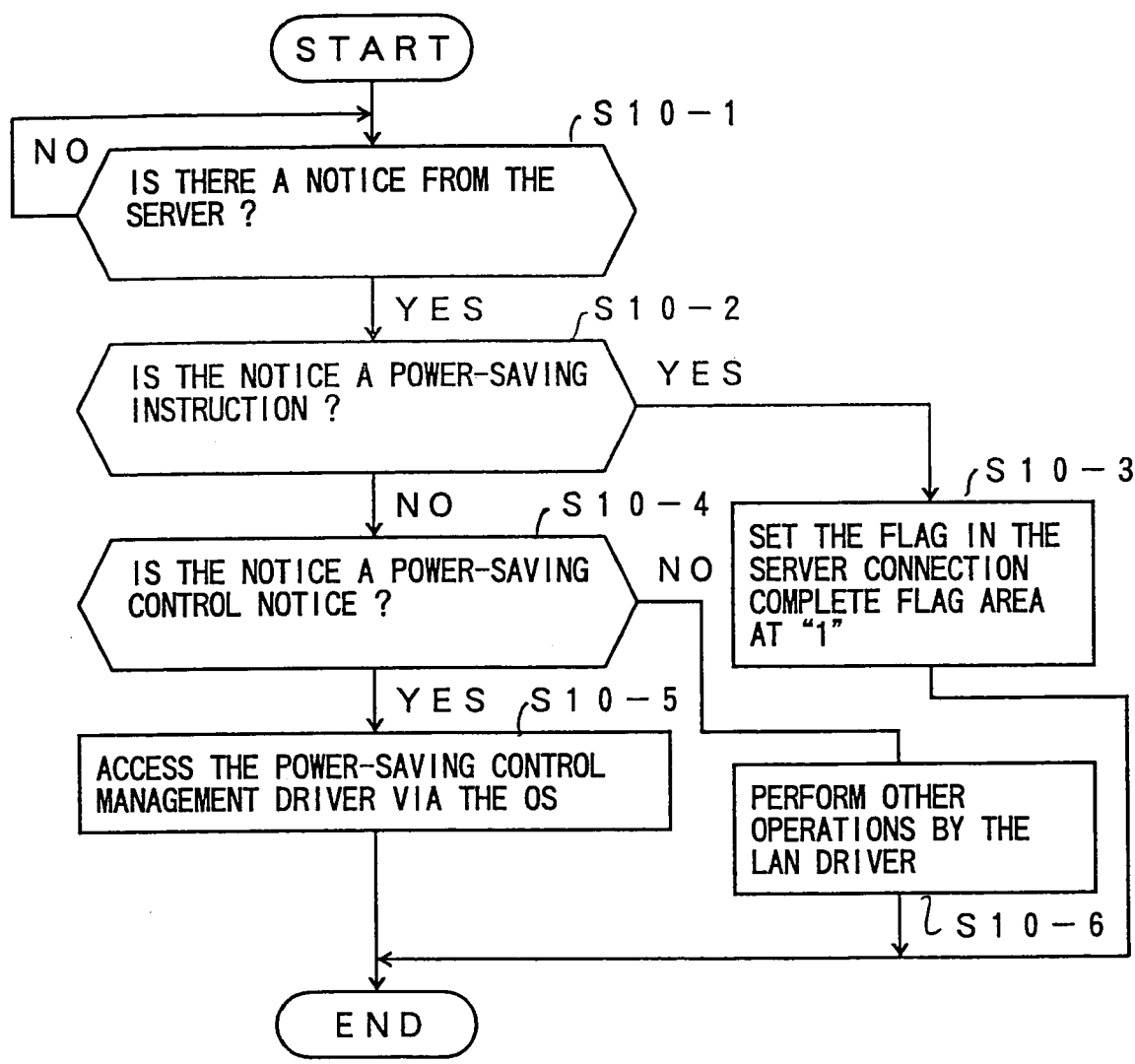
FIG. 19 is a flowchart of a power-saving control notifying operation of the LAN driver of a client.

FIG. 19 is a flowchart of a power-saving control notifying operation of the LAN driver 54 of the client 3-*i*.

In step S10-1, the LAN driver 54 judges whether there is a notice from the server 2 or not. If there is a notice from the server 2, the LAN driver 54 analyzes the notice and judges whether the notice is a power-saving start instruction or not in step S10-2. Such a power-saving start instruction is issued to start the power-saving control performed by the server 2.

If the notice from the server 2 is judged to be a power-saving instruction, the flag in the server connection complete flag area 91 is set at "1" indicating that the connection between the client 3-*i* and the server 2 is complete in step S10-3. The operation then comes to an end.

If the notice from the server 2 is judged not to be a power-saving instruction in step S10-2, the LAN driver 54 judges whether the notice from the server 2 is a power-saving control notice or not in step S10-4. Such a power-saving control notice contains information for performing the power-saving control for the client 3-*i*.

If the notice from the server 2 is judged to be a power-saving control notice in step S10-4, the power-saving management driver 56 is accessed via the OS 53 so that the server 2 can perform the power-saving control for the client 3-*i* in step S10-5.

If the notice from the server 2 is judged not to be a power-saving control notice in step 10-4, the LAN driver 54 performs other processes in step S10-6. The operation then comes to an end.

Figure 20:
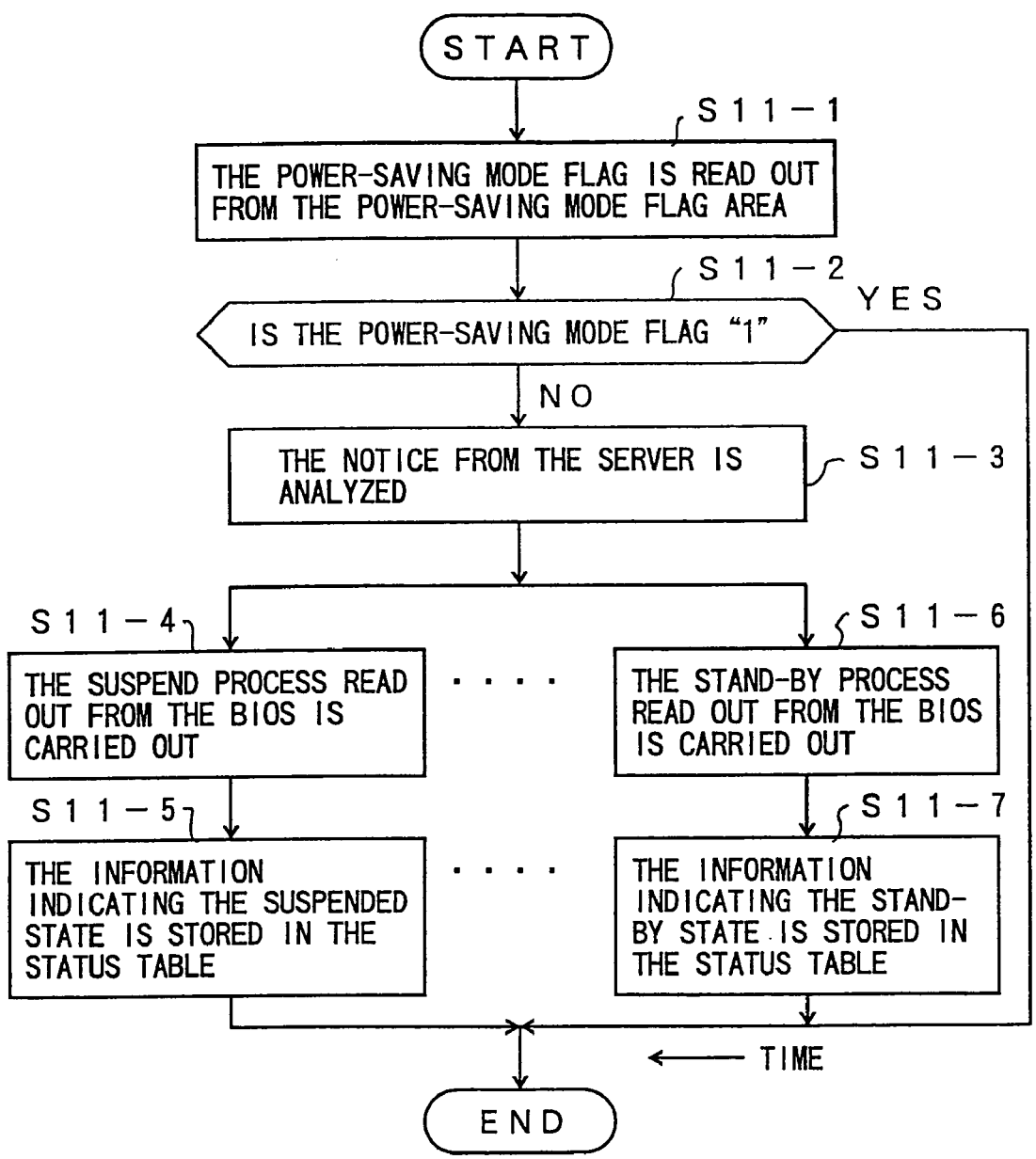
FIG. 20 is a flowchart of an operation using the power-saving control management driver of a client during the transition to the power-saving mode.

FIG. 20 is a flowchart of an operation using the power-saving control management driver 56 of the client 3-*i* during the transition to the power-saving mode.

In step S11-1, the power-saving control management driver 56 reads the flag from the power-saving mode flag area 58. The power-saving control management driver 56 then judges whether the read flag is "1" or "0" in step S11-2.

If the flag read from the power-saving mode flag area 58 is "1", the client 3-*i* performs the power-saving control, and the operation comes to an end. If the flag read from the power-saving mode flag area 58 is "0", the power-saving control management driver 56 analyzes the power-saving control notice sent from the server 2 in step S11-3.

If the power-saving control notice is an instruction to move into the suspended state, the power-saving control management driver 56 carries out the suspend process of the BIOS to put the client 3-*i* into the suspended state in step S11-4. In step S11-5, the power-saving control management driver 56 then stores the information indicating that the client 3-*i* is in the suspended state in the status table 92.

Likewise, if the power-saving control notice is an instruction to move into the stand-by state, the power-saving control management driver 56 carries out the stand-by process of the BIOS so as to put the client 3-*i* into the stand-by state in step S11-6. In step S11-7, the power-saving control management driver 56 then stores the information indicating that the client 3-*i* is in the stand-by state in the status table 92.

In the above manner, the power-saving control for the client 3-*i* can be performed in accordance with the analyzed result of the power-saving control notice sent from the server 2.

In the operation shown in FIG. 20, the BIOS has the power-saving control function. However, the same power-saving control can be performed in a case where the peripheral equipment, such as the hard disk drive 35, has the power-saving control function.

Figure 21:
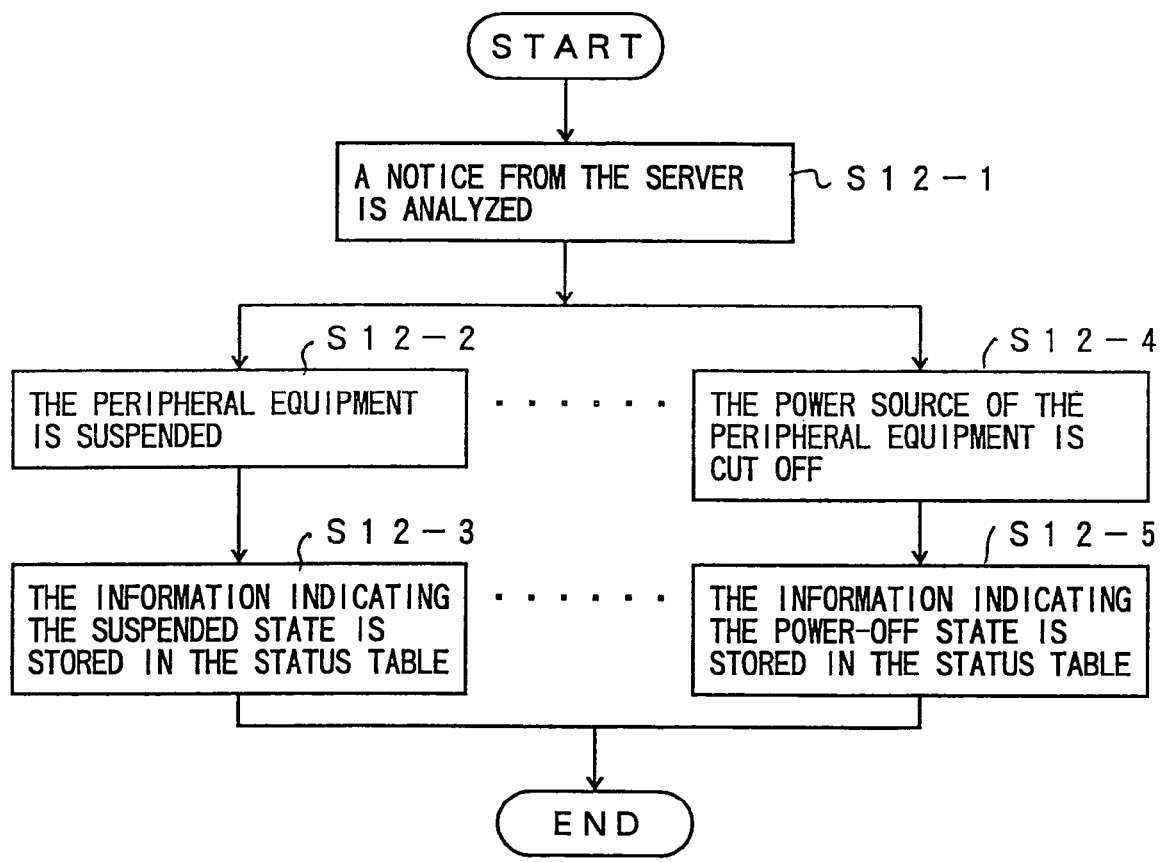
FIG. 21 is a flowchart of an operation of a modification of the power-saving control management driver of a client.

FIG. 21 is a flowchart of an operation of a modification of the power-saving control management driver of the client 3-*i*.

In a case where the peripheral equipment such as the hard disk drive 35 has the power-saving control function, the power-saving control is performed using the power-saving control function of the peripheral equipment in accordance with a notice from the server 2.

In step S12-1, the power-saving control management driver 56 first analyzes a power-saving control notice sent from the server 2. If the analyzed notice is an instruction to move into the suspended state, the power-saving control management driver 56 puts the peripheral equipment into the suspended state in step S12-2. In step S12-3, the power-saving control management driver 56 stores the information indicating the suspended state into the status table 92.

Likewise, if the analyzed notice from the server 2 is an instruction to move into the power-off state, the power-saving control management driver 56 puts the peripheral equipment into the power-off state in step S12-4. In step S12-5, the power-saving control management driver 56 stores the information indicating the power-off state into the status table 92.

In this manner, the power-saving function of the peripheral equipment can be directly controlled, and the power-saving control can be effectively performed.

Figure 22:
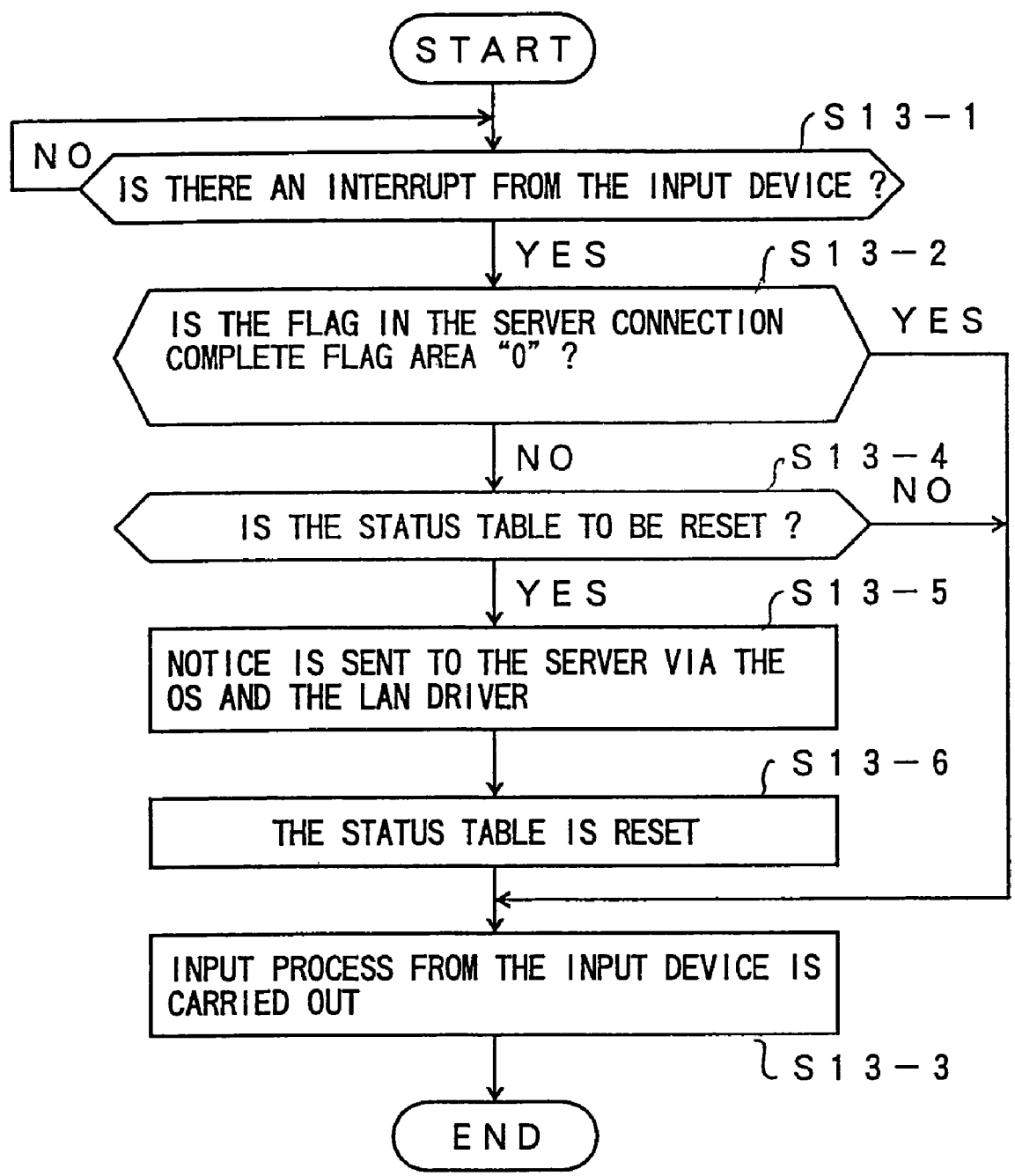
FIG. 22 is a flowchart of an operation of the power-saving control management driver of a client when returning to the normal operation state.

FIG. 22 is a flowchart of an operation of the power-saving control management driver of the client 3-$i$ when returning to the normal operation state.

In step S13-1, the power-saving control management driver 56 judges whether there is an interrupt from the input device 38 such as a keyboard. If there is an interrupt from the input device 38, the power-saving control management driver 56 judges whether the flag in the server connection complete flag area 91 is "0" or not, i.e., whether the client 3-$i$ is connected to the server 2 or not, in step S13-2.

If the flag in the server connection complete flag area 91 is "0", i.e., if the client 3-$i$ is not connected to the server 2, the server 2 does not perform the power-saving control. Accordingly, the power-saving control management driver 56 carries out an input process in accordance with operations through the input device 38 in step S13-3.

If the flag in the server connection complete flag area 91 is "1", i.e., if the client 3-$i$ is connected to the server 2, the power-saving control management driver 56 judges whether the interrupt from the input device 38 is to reset the status table 92 or not in step S13-4.

If the interrupt is to reset the status table 92, the power-saving control management driver 56 sends the server 2 a notice to cancel the power-saving control mode through the LAN driver 54 and the OS 53 via the network 4 in step 13-5. The status table 92 is then returned to the normal operation state (indicated by "00000") in step S13-6.

After resetting the status table 92 to the normal operation state, the power-saving control management driver 56 carries out a process in accordance with an operation through the input device 38 in step 13-3.

Figure 23:
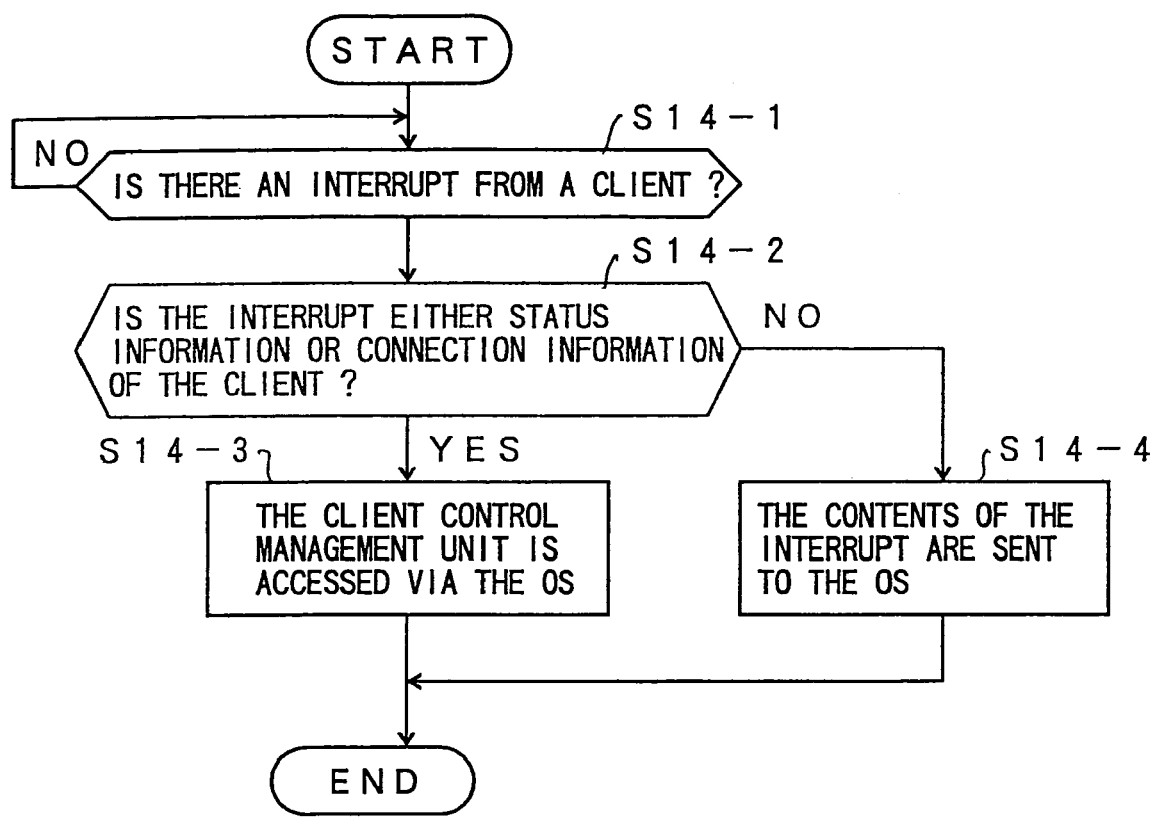
FIG. 23 is a flowchart of an operation performed by the LAN driver of the server when carrying out the power-saving control.

FIG. 23 is a flowchart of an operation performed by the LAN driver 61 of the server 2 when carrying out the power-saving control.

In step S14-1, the LAN driver 61 of the server 2 judges whether there is an interrupt from the client 3-$i$ or not. If there is an interrupt from the client 3-$i$, the LAN driver 61 analyzes the interrupt to determine whether the interrupt is either status information of the client 3-$i$ or a connection notice for establishing the connection with the server 2 in step S14-2.

If the interrupt from the client 3-$i$ is judged to be status information or a connection notice, the LAN driver 61 accesses the client control management unit 72 via the OS 62 in step S14-3.

If the interrupt from the client 3-$i$ is judged to be neither status information nor a connection notice, the LAN driver 61 sends the contents of the interrupt from the client 3-$i$ to the OS 62 so as to perform the process in accordance with the contents in step S14-4.

Figure 24:
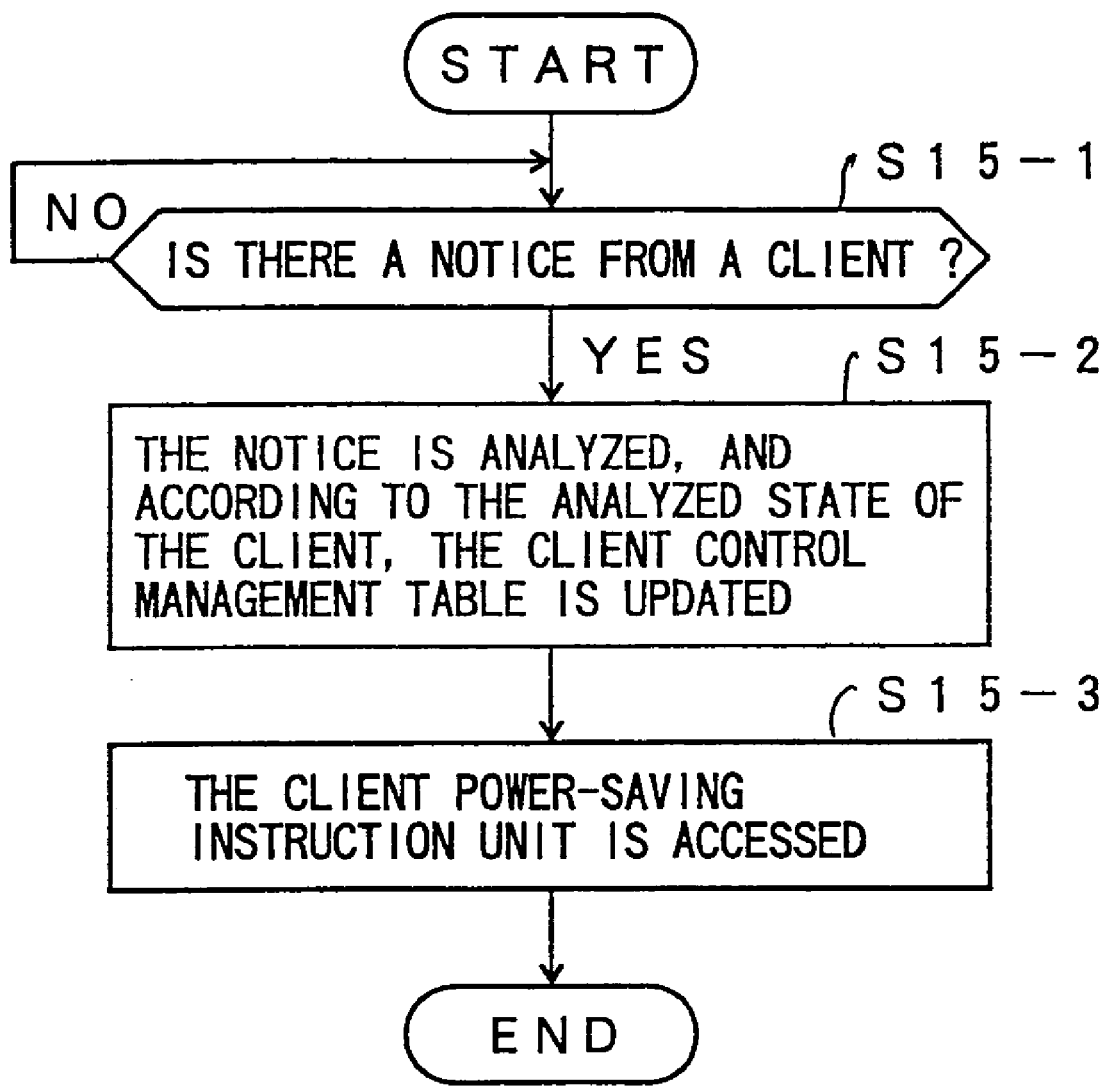
FIG. 24 is a flowchart of an operation performed by a client control management unit of the server when performing the power-saving control for a client.

FIG. 24 is a flowchart of an operation performed by the client control management unit 72 of the server 2 when performing the power-saving control for a client 3-$i$.

In step S15-1, the client control management unit 72 judges whether there is a notice from the client 3-$i$. If the client control management unit 72 receives a notice from the client 3-$i$ via the LAN driver 61, the client control management unit 72 analyzes the notice and updates the contents of the client control management table 71 in accordance with the analyzed state of the client 3-$i$ in step S15-2.

After updating the client control management table 71, the client control management unit 72 accesses the client power saving instruction unit 63 in step S15-3.

Figure 25:
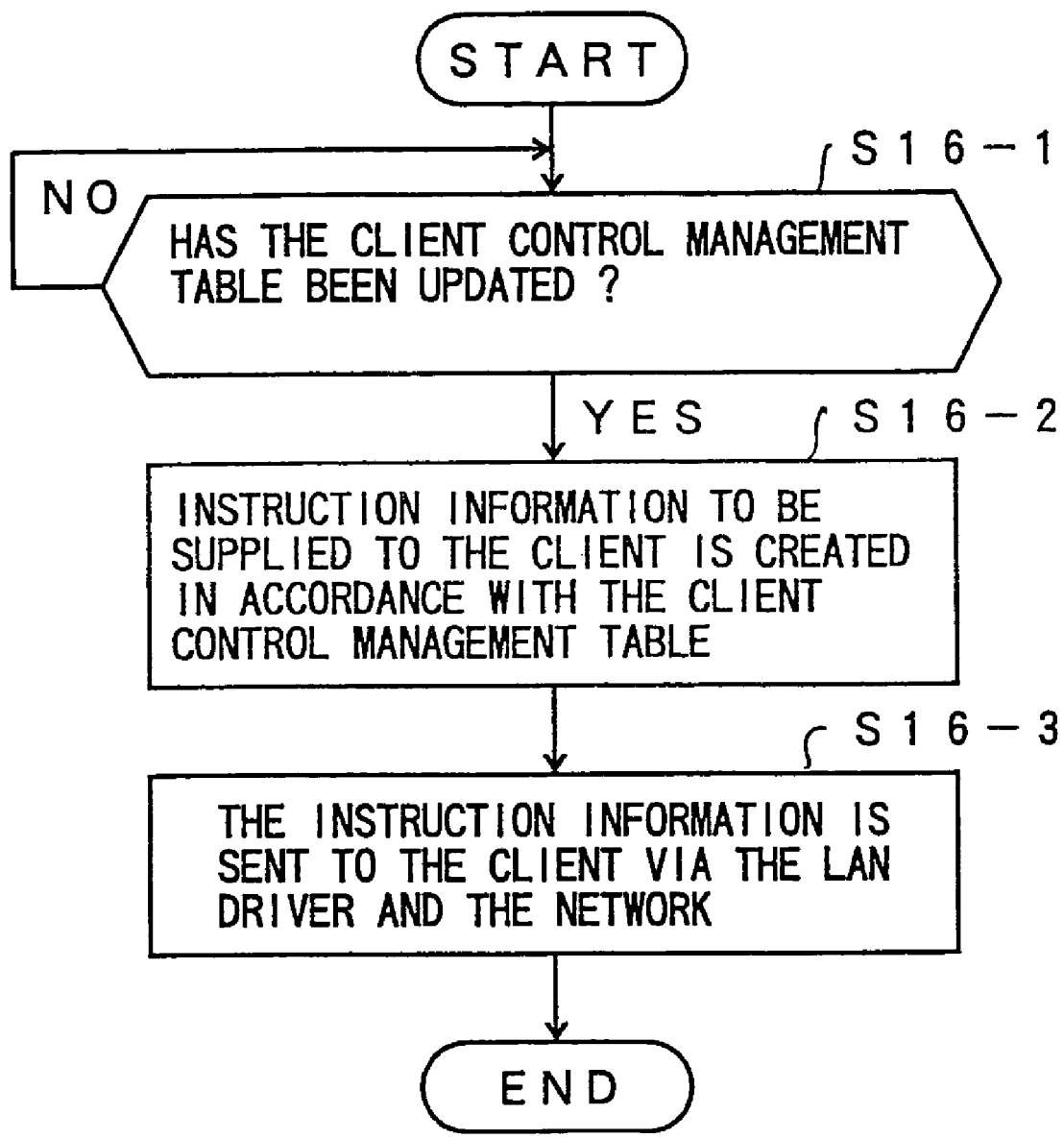
FIG. 25 is a flowchart of an operation performed by a client power-saving instruction unit of the server.

FIG. 25 is a flowchart of an operation performed by the client power-saving instruction unit 63 of the server 2.

In step S16-1, the client power-saving instruction unit 63 judges whether the client control management table 71 has been updated or not. If the client control management table 71 has been updated, the client power-saving instruction unit 63 creates instruction information to be supplied to the client 3-$i$ in accordance with the status information in the updated client control management table 71 and a built-in timer in the server 2 in step S16-2. Here, the client power-saving instruction unit 63 monitors the time of each status contained in the client control management table 71 by the built-in timer. If there is no notice from the corresponding client 3-$i$ within a predetermined time, the client power-saving instruction unit 63 creates instruction information for moving the client 3-$i$ into the suspended state in step S16-2.

After creating the instruction information to be sent to the client 3-$i$, the client power-saving instruction unit 63 sends the instruction information to the client 3-$i$ via the LAN driver 61 and the network 4 in step S16-3.

Figure 26:
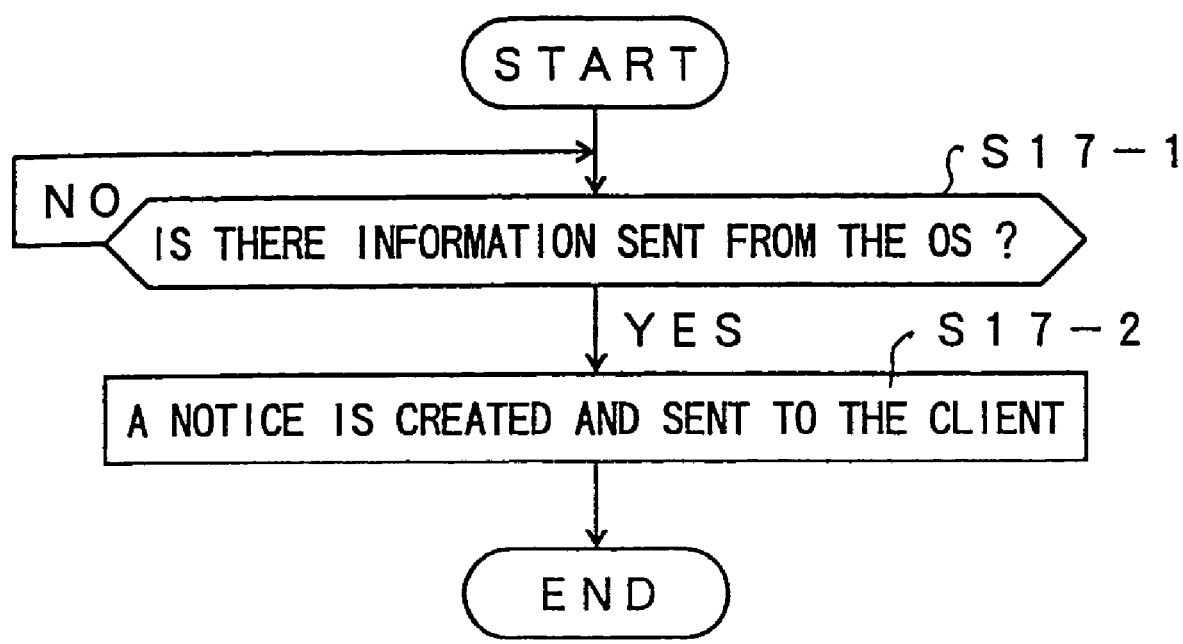
FIG. 26 is a flowchart of an operation of the LAN driver of the server when transmitting information.

FIG. 26 is a flowchart of an operation of the LAN driver 61 of the server 2 when transmitting information.

In step S17-1, the LAN driver 61 judges whether there is information sent from the OS 62 or not. If there is, the LAN driver 61 creates a notice in accordance with the information sent from the OS 62, and sends the notice to the client 3-$i$ in step S17-2.

Figure 27:
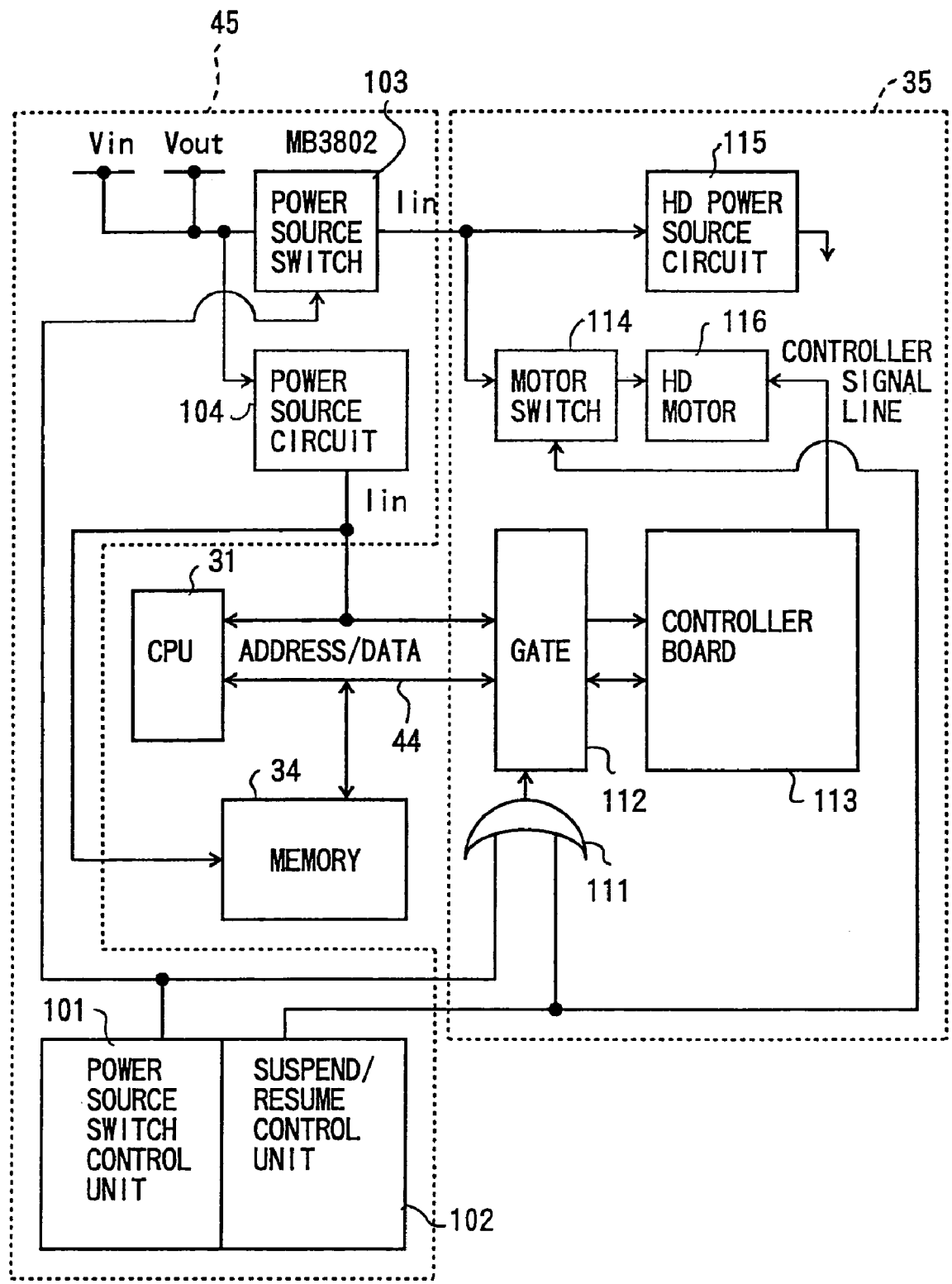
FIG. 27 is a block diagram of a hard disk drive of a client.

FIG. 27 is a block diagram of the hard disk drive 35 of a client 3-$i$. In this figure, the same components as in FIG. 3 are indicated by the same reference numerals.

The power source control unit 45 comprises a power source switch control unit 101, a suspend/resume control unit 102, a power source switch 103, and a power source circuit 104.

The power source switch control unit 101 is a main switch for the client 3-$i$, and is operated to control the supply of a power source voltage Vin. The suspend/resume control unit 102 is operated to move the client 3-$i$ into the suspended state or the resume state. The power source switch 103 is controlled by switching on and off the power source switch control unit 101, so as to control the power source supply to the hard disk drive 35. The power source circuit 104 generates power source voltages from the power source voltage Vin, and supplies the power source voltages to the CPU 31, the memory 34, and the hard disk drive 35.

The hard disk drive 35 comprises an OR gate 111, a gate 112, a controller board 113, a motor switch 114, an HD power source circuit 115, and an HD motor 116.

The OR gate 111 performs an OR logic operation on an output of the power source switch control unit 101 and an output of the suspend/resume control unit 102, and supplies a result of the OR logic operation as a control signal to the gate 112.

The gate 112 is connected to the bus 44, the power source circuit 104, and the controller board 113 so as to control the connection between the bus 44 and the controller board 113 as well as the connection between the power source circuit 104 and the controller board 113. The gate 112 is turned off when the power source switch control unit 101 is off or the information in the suspend/resume control unit 102 indicates the suspended state. The gate 112 is turned on when the power source switch control unit 101 is on or the information in the suspend/resume control unit 102 contains an instruction to cancel the suspended state.

With the gate 112 being on and connected to the bus 44 and the power source circuit 104, the controller board 113 controls the operation of the hard disk drive 35.

The motor switch 114 is disposed between the power source switch 103 and the HD motor 116, and controls the power supply from the power source switch 103 to the HD motor 116 in accordance with the state of the suspend/resume control unit 102. The motor switch 114 is turned on when the suspend/resume control unit 102 is not in the suspended state, and supplies power from the power source switch 103 to the HD motor 116. The HD motor is thus driven by the power source supplied from the motor switch 114. The motor switch 114 is turned off when the suspend/resume control unit 102 is in the suspended state, and cuts off the power supply from the power source switch 103 to the HD motor 116. Here, no power is supplied to the HD motor 116, and the HD motor 116 is stopped. The hard disk drive 35 is thus put in the power-saving mode.

The HD power source circuit 115 is connected to the power source switch 103, and generates power source voltages to be supplied to the components in the hard disk drive 35 from the power source voltage supplied from the power source switch 103.

The hard disk drive 35 is thus put in the power-saving mode, with the information of the suspend/resume control unit 102 being controlled in accordance with the notice from the server 2.

Figure 28:
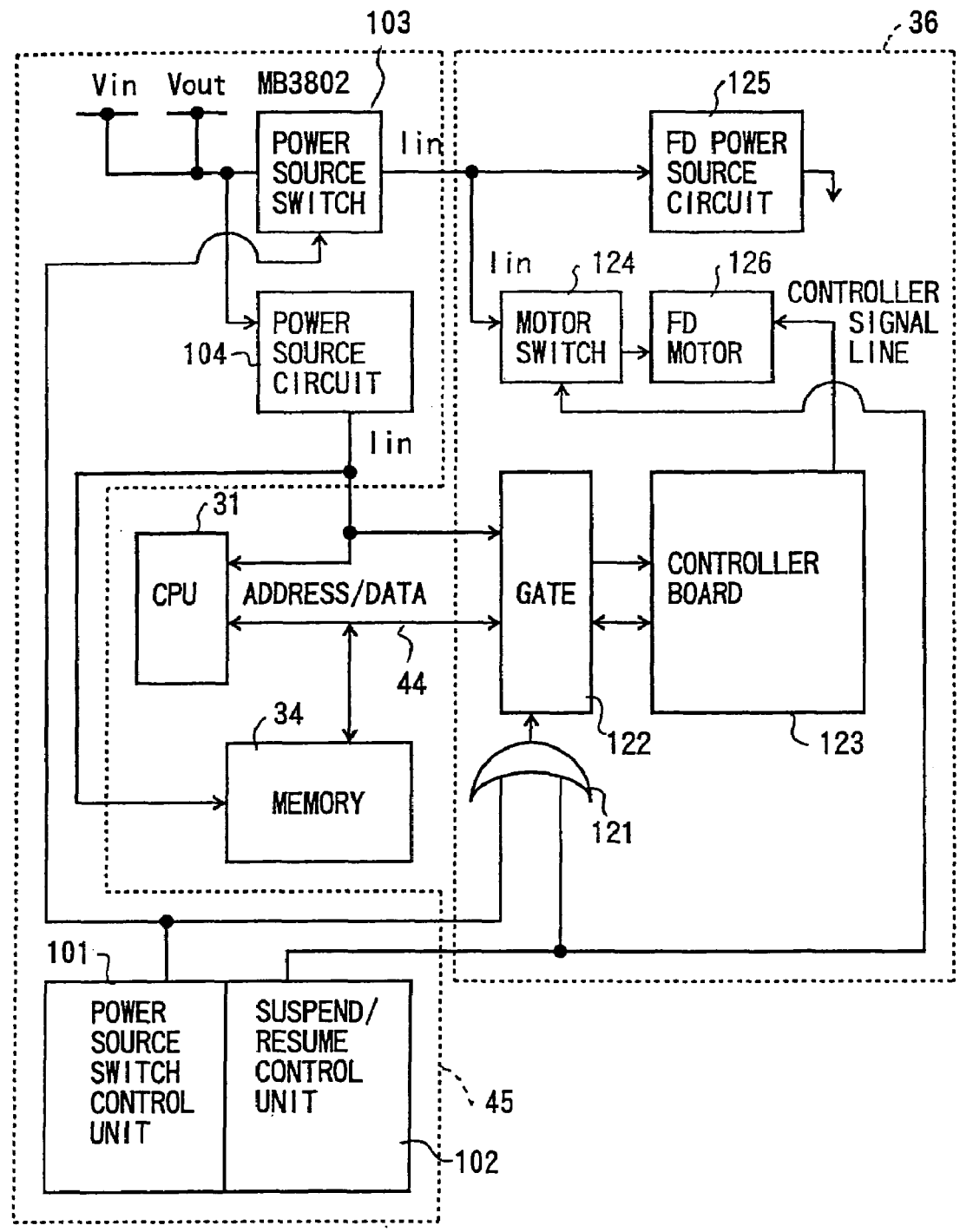
FIG. 28 is a block diagram of a floppy disk drive of a client.

FIG. 28 is a block diagram of the floppy disk drive 36 of the client 3-i. In this figure, the same components as in FIG. 27 are indicated by the same reference numerals.

The floppy disk drive 36 comprises an OR gate 121, a gate 122, a controller board 123, a motor switch 124, an FD power source circuit 125, and an FD motor 126.

The OR gate 121 performs an OR logic operation on an output of the power source switch control unit 101 and an output of the suspend/resume control unit 102, and supplies a result of the OR logic operation as a control signal to the gate 122.

The gate 122 is connected to the bus 44, the power source circuit 104, and the controller board 123, and controls the connection between the bus 44 and the controller board 123 as well as the connection between the power source circuit 104 and the controller board 123. The gate 122 is turned off when the power source switch control unit 101 is off or the information stored in the suspend/resume control unit 102 indicates the suspended state. On the other hand, the gate 122 is turned on when the power source switch control unit 101 is on or the information stored in the suspend/resume control unit 102 contains an instruction to cancel the suspended state.

The controller board 123 controls the operation of the floppy disk drive 36, with the gate 122 being on and connected to the bus 44 and the power circuit 104.

The motor switch 124 is disposed between the power source switch 103 and the FD motor 126, and controls the power supply from the power source switch 103 to the FD motor 126 in accordance with the state of the suspend/resume control unit 102. The motor switch 124 is turned on when the suspend/resume control unit 102 is not in the suspended state, and supplies power from the power source switch 103 to the FD motor 126. Thus, the FD motor 126 is driven by the power source supplied from the motor switch 124. When the suspend/resume control unit 102 is in the suspended state, the motor switch 124 is turned off, and cuts off the power supply from the power source switch 103 to the FD motor 126. Accordingly, the power source is not supplied to the FD motor 126, and is put in a stopped state. Thus, the floppy disk drive 36 is put in the power-saving mode.

The FD power source circuit 125 is connected to the power source switch 103, and generates power source voltages to be used in the floppy disk drive 36 in accordance with the power source supplied from the power source switch 103.

The floppy disk drive 36 is thus put in the power-saving mode by controlling the information of the suspend/resume control unit 102 in accordance with the notice from the server 2.

Figure 29:
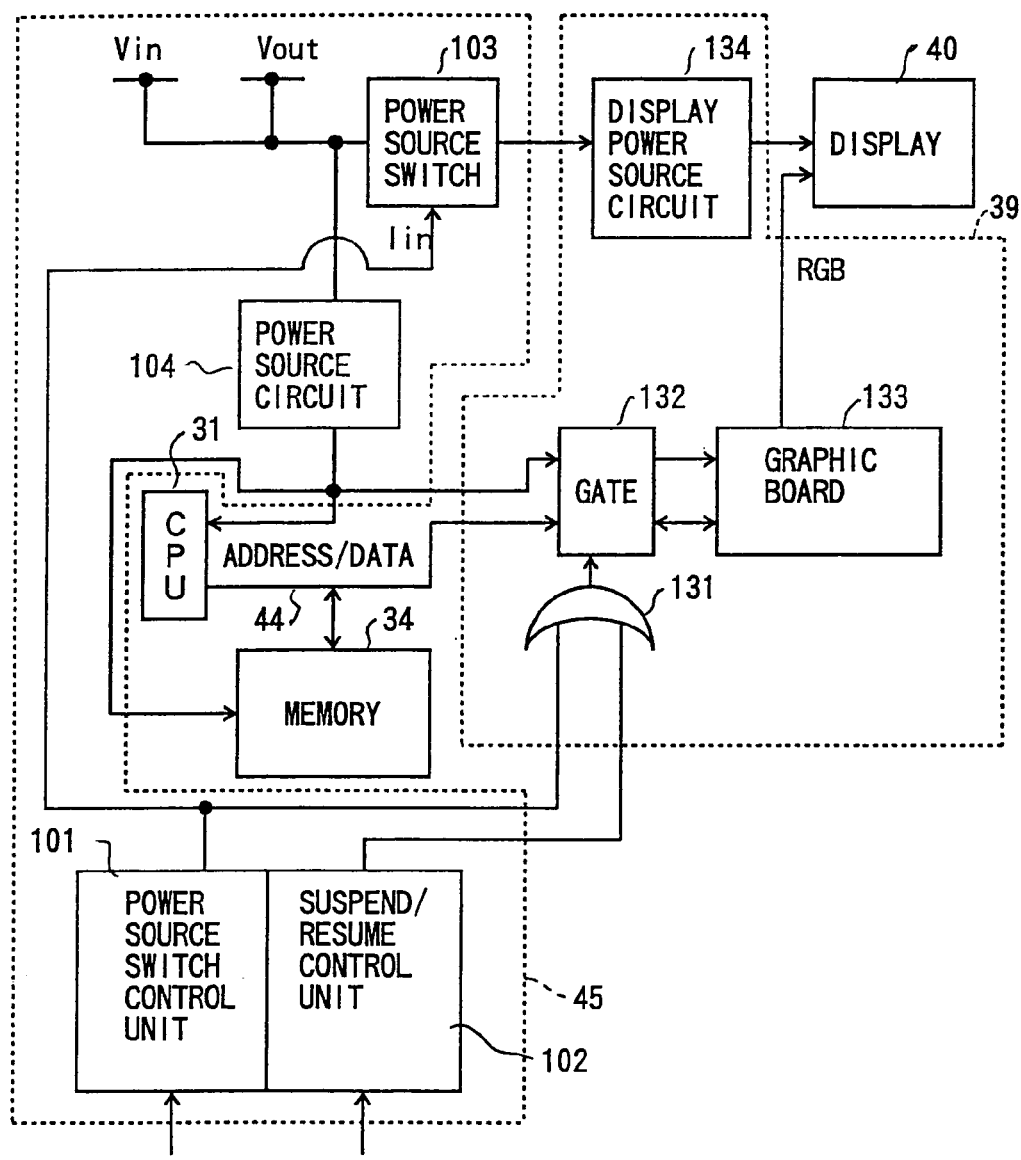
FIG. 29 is a block diagram of a display circuit of a client of the present invention.

FIG. 29 is a block diagram of the display circuit 39 of a client 3-i of the present invention. In this figure, the same components as in FIG. 27 are indicated by the same reference numerals.

The display circuit 39 comprises an OR gate 131, a gate 132, a graphic board 133, and a display power source circuit 134.

The OR gate 131 performs an OR logic operation on an output of the power source switch control unit 101 and an output of the suspend/resume control unit 102, and supplies a result of the OR logic operation as a control signal to the gate 132.

The gate 132 is connected to the bus 44, the power source circuit 104, and the graphic board 133. The gate 132 controls the connection between the bus 44 and the graphic board 133 as well as the connection between the power source circuit 104 and the graphic board 133. When the power source switch control unit 101 is on or the information in the suspend/resume control unit 102 indicates the suspended state, the gate 132 is turned off. When the power source switch control unit 101 is on or the information in the suspend/resume control unit 102 contains an instruction to cancel the suspended state, the gate 132 is turned on.

With the gate 132 being on and connected to the bus 44 and the power source circuit 104, the graphic board 133 processes data, and supplies display data to the display 40.

The display power source circuit 134 generates a voltage to be applied to the display 40 in accordance with the power source supplied from the power source switch 103.

The display circuit 39 is thus put in the power saving mode by controlling the information of the suspend/resume control unit 102 in accordance with the notice from the server 2.

Figure 30:
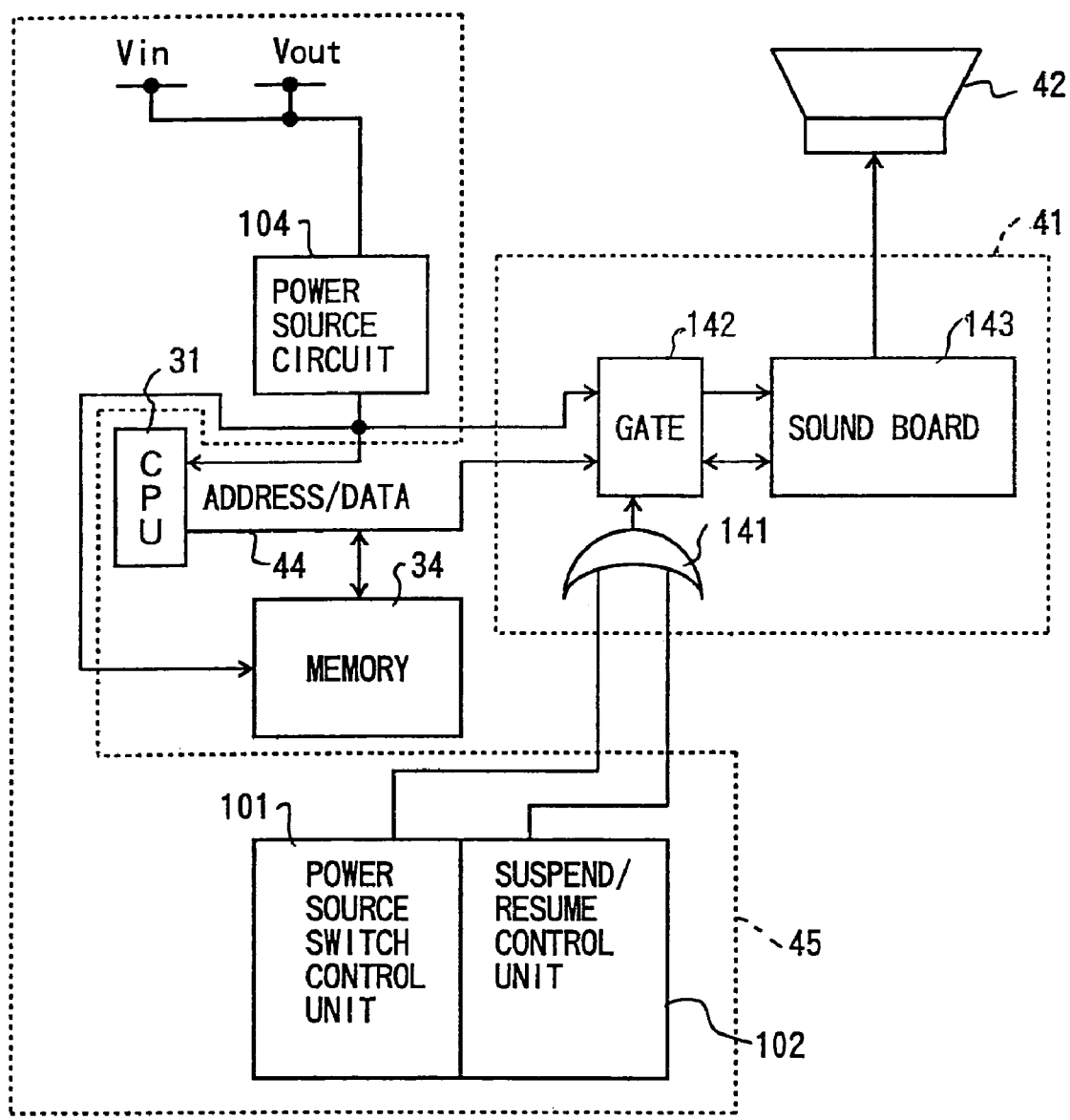
FIG. 30 is a block diagram of an amplifier board of a client of the present invention.

FIG. 30 is a block diagram of the amplifier board 41 of a client 3-i of the present invention. In this figure, the same components as in FIG. 27 are indicated by the same reference numerals.

The amplifier board 41 comprises an OR gate 141, a gate 142, and a sound board 143.

The OR gate 141 performs an OR logic operation on an output of the power source switch control unit 101 and an output of the suspend/resume control unit 102, and sends a result of the OR logic operation as a control signal to the gate 142.

The gate 142 is connected to the bus 44, the power source circuit 104, and the sound board 143, so as to control the connection between the bus 44 and the sound board 143 as well as the connection between the power source circuit 104 and the sound board 143. When the power source switch control unit 101 is off or the information in the suspend/resume control unit 102 indicates the suspended state, the gate 142 is turned off. When the power source switch control unit 101 is on or the information in the suspend/resume control unit 102 contains an instruction to cancel the suspended state, the gate 142 is turned off.

The sound board 143 processes data supplied from the bus 44 and supplies an audio signal to the speaker 42, with the gate 142 being on and connected to the bus 44 and the power source circuit 104.

The amplifier board 41 is thus put in the power-saving mode by controlling the information in the suspend/resume control unit 102 in accordance with the notice from the server 2.

Figure 31:
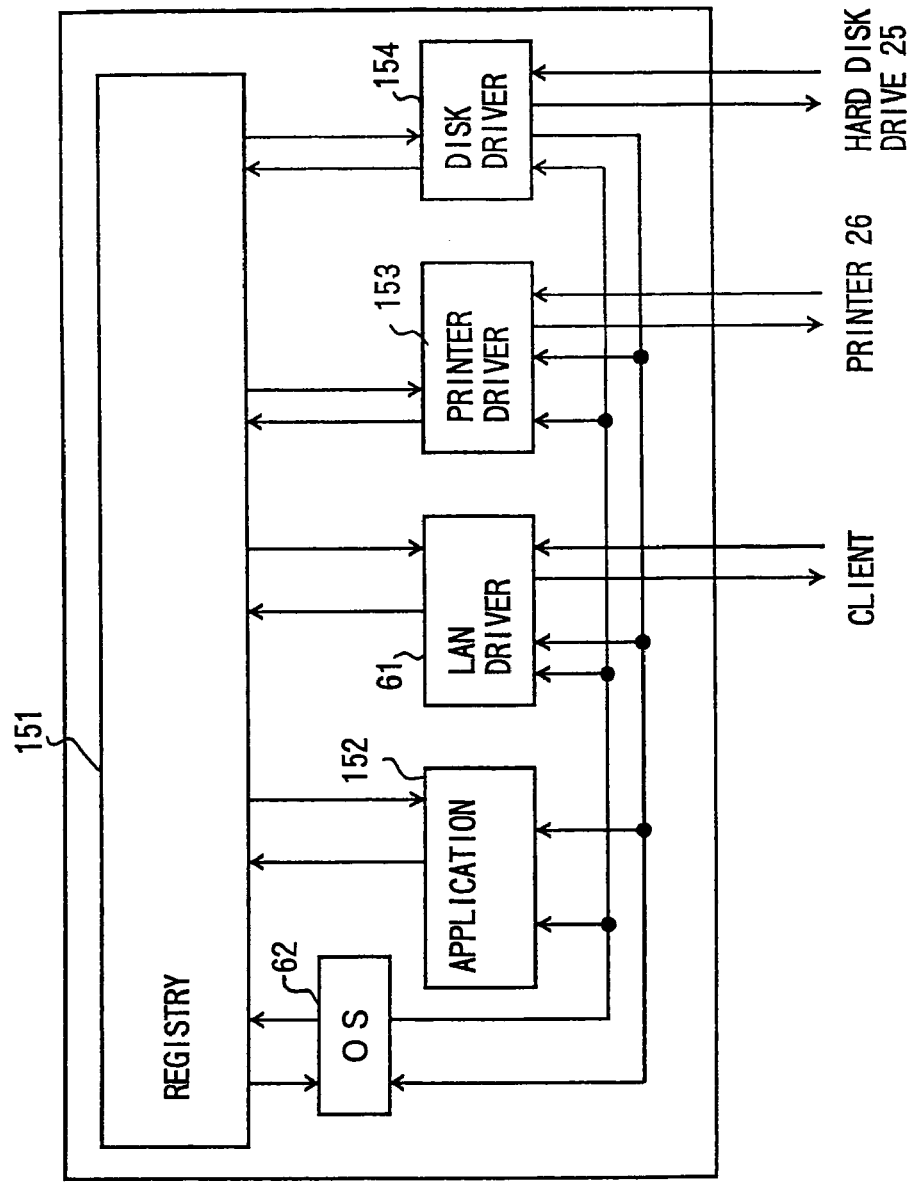
FIG. 31 is a functional block diagram of the server when performing the power-saving control for equipment shared with the clients.

FIG. 31 is a functional block diagram of the server 2 when performing the power-saving control for the equipment shared with the clients 3-1 to 3-N. In this figure, the same components as in FIG. 5 are indicated by the same reference numerals. In this embodiment, the printer 26 and the hard disk drive 25 are used as the shared equipment.

The server 2 comprises a registry 151, an application 152, and a printer driver 153 for performing the power-saving control for the shared equipment.

The registry 151 stores information for controlling the operation environment of the OS 62, the LAN driver 61, the printer driver 153, and the disk driver 154.

Figure 32:
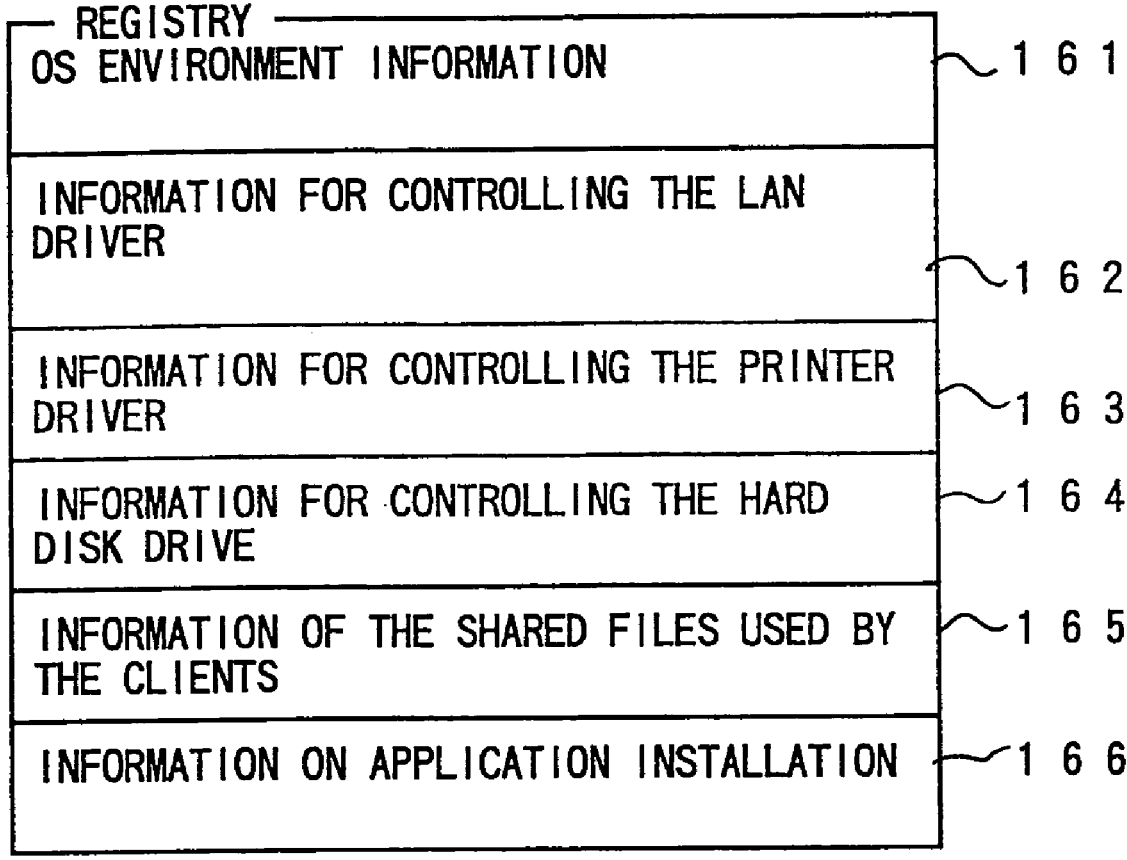
FIG. 32 shows the data structure of a registry of the server of the present invention.

FIG. 32 shows the data structure of the registry 151 of the server 2.

The registry 151 contains OS environment information 161, LAN driver control information 162, printer driver control information 163, hard disk driver control information 164, shared file information 165, and installation information 166.

The OS environment information 161 is used to control the operation environment of the OS 62. The LAN driver control information 162 is used to control the LAN driver 162. The printer driver control information 163 is used to control the printer driver 153. The hard disk driver control information 164 is used to control the hard disk driver 154. The shared file information 165 is to manage the file names and drives of shared files. The installation information 166 is used to manage installed applications.

FIG. 33 shows the data structure of the shared file information 165.

The shared file information 165 comprises file/printer name information 171 and drive and path name information 172.

The file/printer name information 171 stores the file names or folder names of files shared among the clients 3-1 to 3-N. The drive and path name information 172 stores the drives and path names of the files corresponding to the file names or folder names. In accordance with the shared file information 165, the OS 62 can recognize the files shared among the clients 3-1 to 3-N.

Figure 34A:
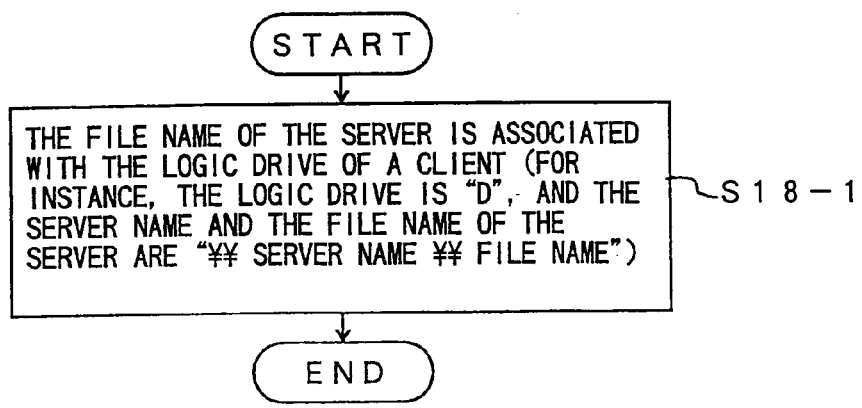
FIGS. 34A to 34C are flowcharts of a client when accessing the server.
Figure 34B:
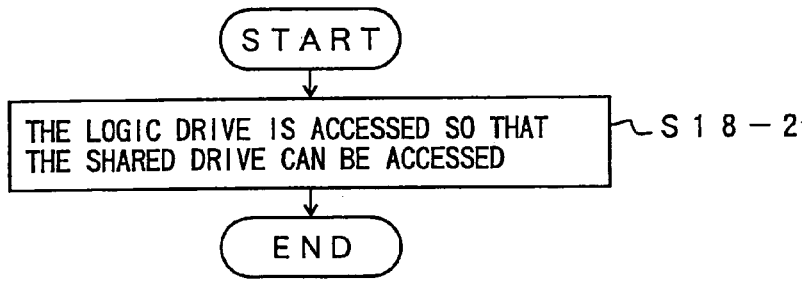
Figure 34C:
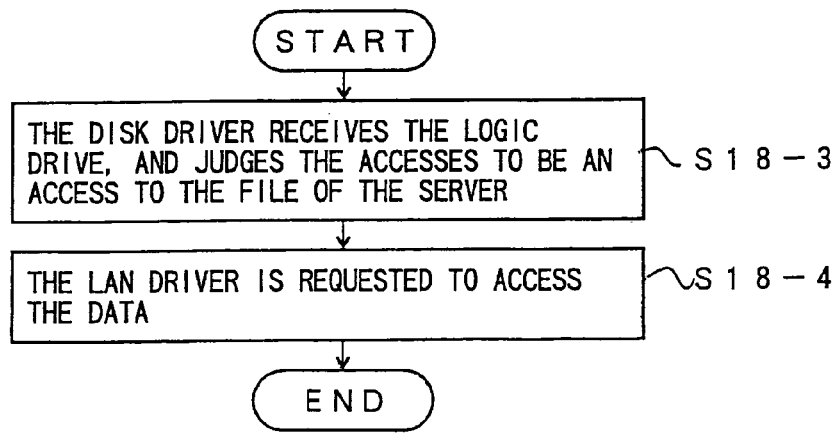

FIGS. 34A to 34C are flowcharts of a client 3-*i* when accessing the server 2. FIG. 34A shows an operation of allocating a logic drive. FIG. 34B shows an operation of accessing the file allocated by the logic drive. FIG. 34C shows an operation of accessing the logic drive.

As shown in FIG. 34A, an operation of associating the file name of the server 2 with the logic drive of the client 3-*i* is performed in step S18-1. In this operation, the logic drive of the client 3-*i* is named "D:", and the server name of the server 2 and the file name set in the server 2 are set as "¥¥ (server name) ¥¥ (file name)", for instance. Here, the server name is a name employed to identify the server 2. The file name is the name of the shared file set in the server 2 as shown in FIG. 33.

In step S18-2 shown in FIG. 34B, the application of the client-i accesses the logic drive that has been set in the operation of FIG. 34A, so that the application can access the shared file of the server 2.

If there is an access from the application to the logic drive having the shared file in step S18-2, the disk driver of the client 3-*i* judges the access to be an access to the file or printer of the server 2 in accordance with the associated name in step S18-3. The disk driver of the client 3-*i* then requests the LAN driver 54 to access the desired data in step S18-4.

Figure 35A:
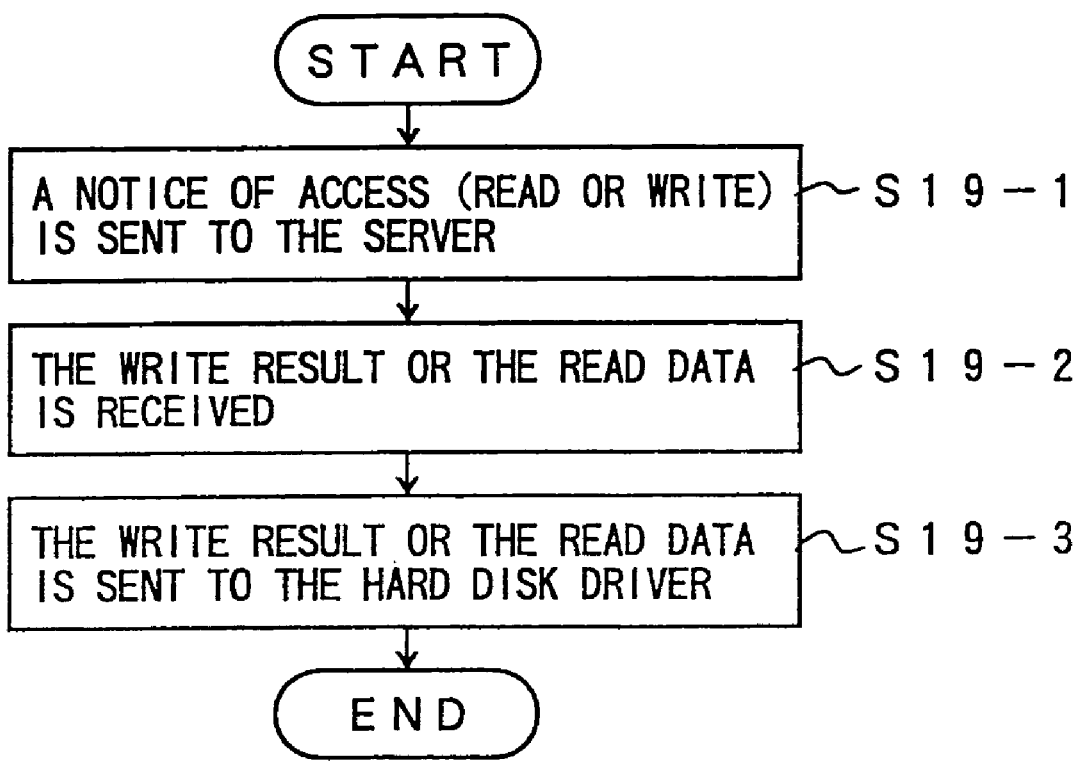
FIGS. 35A and 35B are flowcharts of an operation of a client when accessing the shared file.
Figure 35B:
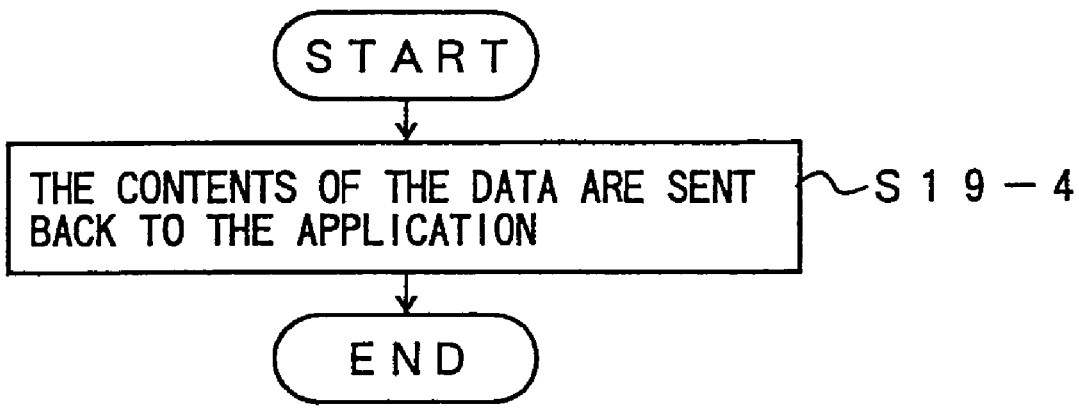

FIGS. 35A and 35B are flowcharts of an operation of a client 3-*i* when accessing the shared file. FIG. 35A shows an operation of the LAN driver 54 when client 3-*i* accesses the server 2. FIG. 35B shows an operation of the client 3-*i* when there is a notice in response to the access to the shared file.

Upon receipt of a notice of access request from the application of the client 3-*i*, the LAN driver 54 sends the notice provided with a server name and a file/folder name corresponding to the server 2 in step S19-1. The server 2 then accesses the shared file in response to the access request from the client 3-*i* to write or read data. When writing data, the server 2 sends a notice of the end of writing to the client 3-I, and when reading data, the server 2 sends desired data to the client 3-*i* in step S19-2.

After receiving the data write result or the data from the server 2, the LAN driver 54 supplies the result or the data received from the server 2 to the hard disk driver 154 of the client 3-*i* in step S19-3.

After receiving the data write result or the data from the LAN driver 54, the hard disk driver 154 supplies the notice of the end of writing or the data to the application that has accessed the shared file of the server 2 in step S19-4.

Figure 36:
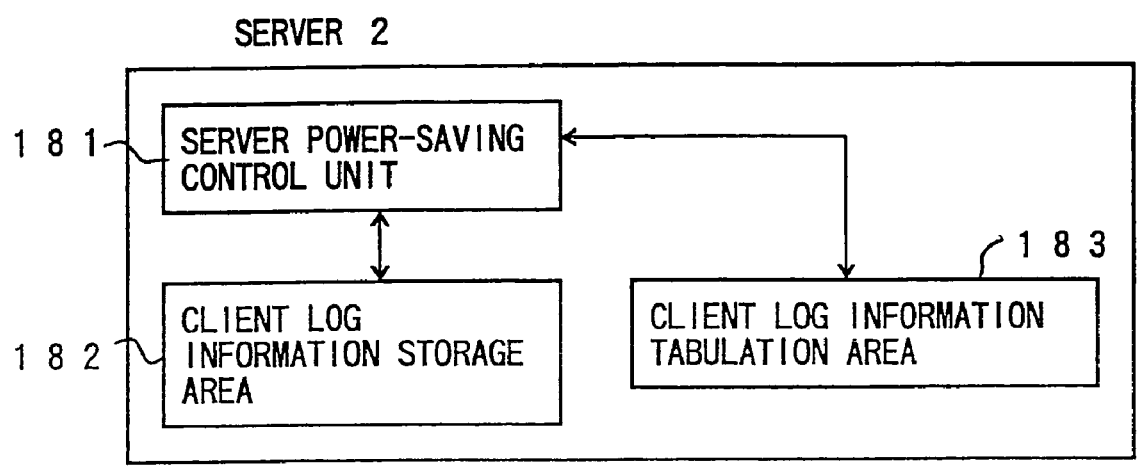
FIG. 36 is a functional block diagram of the server when performing the power-saving control in response to an access from a client.

FIG. 36 is a functional block diagram of the server 2 when performing the power-saving control in response to an access from a client 3-*i*.

The server 2 comprises a server power-saving control unit 181, a client LOG information storage area 182, and a client LOG information tabulation area 183 for performing the power-saving control in response to an access from the client 3-*i*.

The server power-saving control unit 181 performs the power-saving control for the hard disk drive 25 or the printer 26 of the server 2 in accordance with the contents of the client LOG information storage area 182 and the client LOG information tabulation area 183. The client LOG information storage area 182 stores historical information such as the names of clients which have accessed the server 2 so far, the names of devices, the names of files, and access times.

FIG. 37 shows the data structure of the client LOG information storage area 182.

The information stored in the client LOG information storage area 182 includes client information 191, device name information 192, file/printer name information 193, and access time information 194. The client information 191 is used to identify the clients that have accessed the server 2 so far. The device name information 192 is used to identify devices in the server 2 which have been accessed from the client 3-*i* so far. The file/printer name information 193 is used to identify a file or printer which has been accessed from the client 3-*i* so far. The access time information 194 shows times when the client 3-*i* has accessed the server 2.

The client LOG information storage area 182 is updated every time the client 3-*i* accesses the server 2. The client LOG information tabulation area 183 stores tabulated contents of the client LOG information storage area 182 for each device in the server 2.

FIGS. 38A and 38B show example data structures of the client LOG information tabulation area 183.

As shown in FIG. 38A, the client LOG information tabulation area 183 comprises device name information 201 of the server 2 and access time interval information 202, for instance.

The device name information 201 contains the names of devices for which the server 2 is to perform the power-saving control. The access time interval information 202 stores the time interval between the previous-access and the current access from the client 3-*i* for each device. In accordance with the access time interval information 202, the server power-saving control unit 181 performs the power-saving control for a device corresponding to the device name information 201.

The client LOG information tabulation area 183 may also store file and printer name information 203 as well as the device name information 201 and the access time interval information 202. The access time interval information 202 is associated with each file name or printer name. Thus, the power-saving control can be performed for each file name or the printer name.

Figure 39:
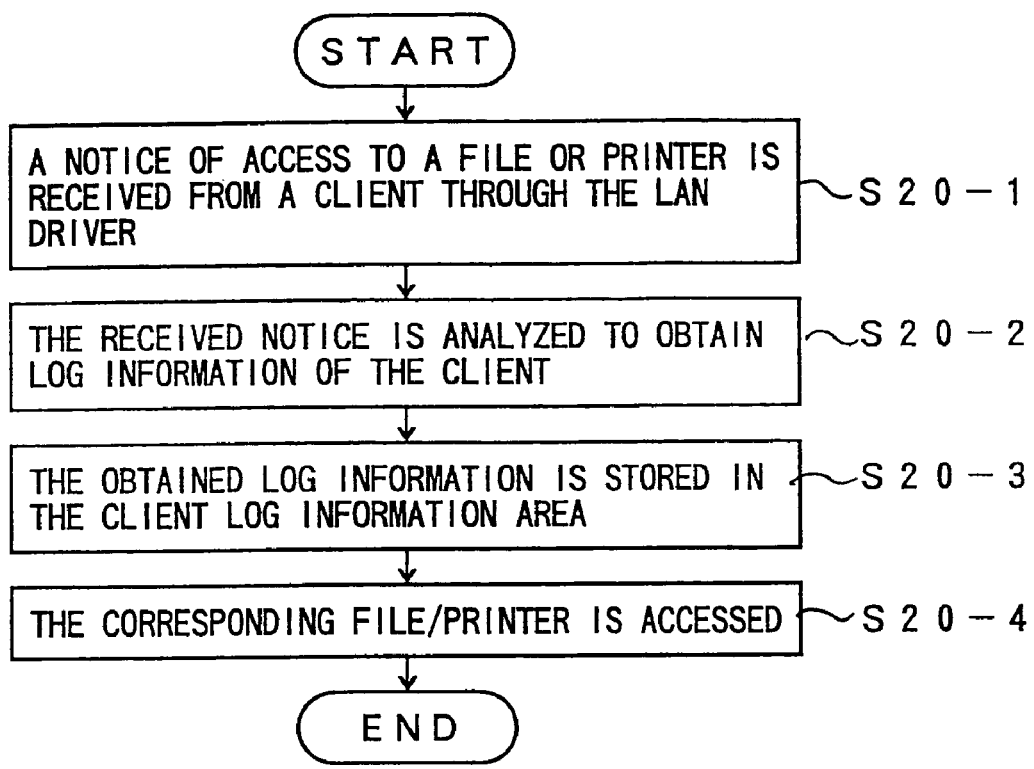
FIG. 39 is a flowchart of an operation of the server when creating a client LOG information area.

FIG. 39 is a flowchart of an operation of the server 2 when creating the client LOG information storage area 182.

In step S20-1, the server 2 receives an access notice for the hard disk drive 25 or the printer 26 from a client 3-$i$ through the LAN driver 61. In step S20-2, the server 2 analyzes the received notice and obtains the name of the client that has made the access, the name of the device to be accessed, the file/printer name, and the access time. In step S20-3, the server 2 stores the client name, the device name, the file/printer name, and the access time into the client LOG information storage area 182 as shown in FIG. 37. In step S20-4, the server 2 accesses the file/printer of the device corresponding to the stored device name.

By repeating the steps S20-1 to 20-4, the client LOG information storage area 182 as shown in FIG. 37 is created.

Figure 40A:
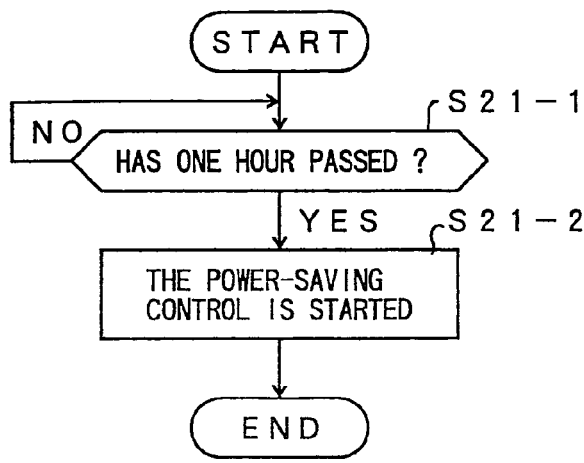
FIGS. 40A and 40B are flowcharts of an operation of a server power-saving control unit of the server.
Figure 40B:
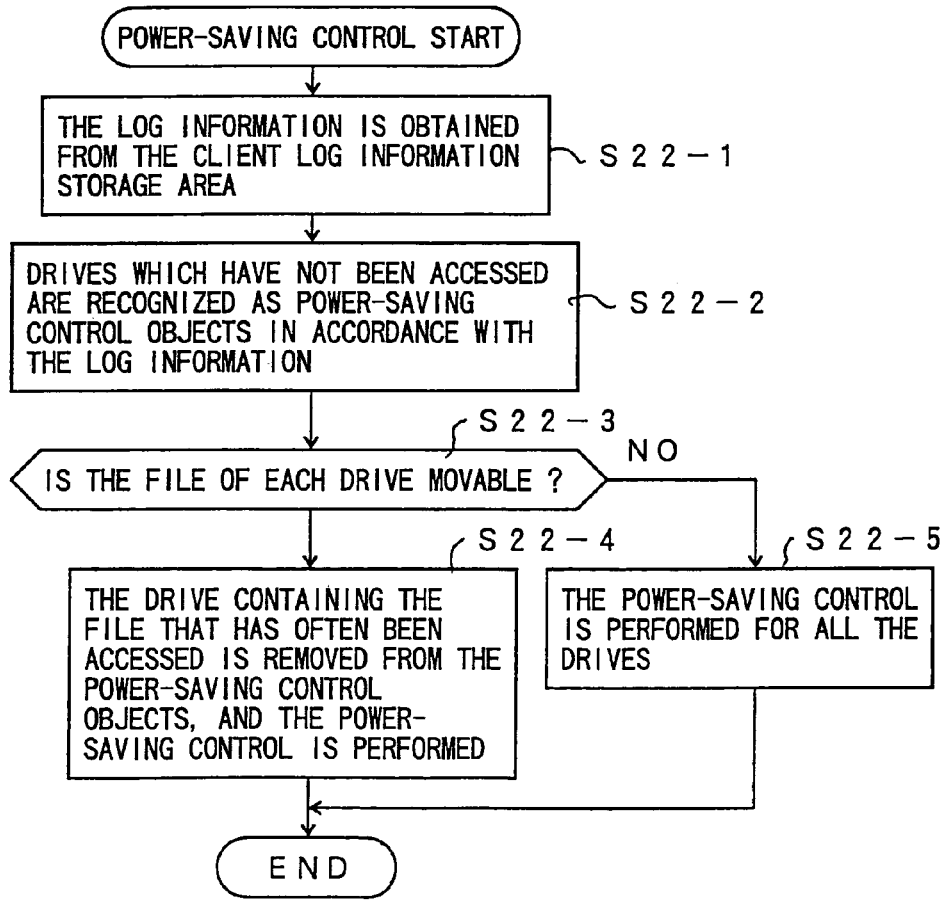

FIGS. 40A and 40B are flowcharts of an operation of the server power-saving control unit 181 of the server 2. FIG. 40A shows a start-up operation of the server power-saving control, and FIG. 40B shows the power-saving control.

In step S21-1 in FIG. 40A, the power-saving control unit 181 judges whether one hour has passed or not. After one hour has passed, the power-saving control unit 181 generates a timer interrupt and starts the power-saving control in step S21-2.

After the start of the power-saving control, the power-saving control unit 181 obtains LOG information from the client LOG information storage area 182 in step S22-1 in FIG. 40B. In step S22-2, the power-saving control unit 181 detects drives that have not been accessed in accordance with the LOG information, and subjects the drives to the power-saving control. In step S22-3, the power-saving control unit 181 judges whether the file of one of the drives in the hard disk drive can be moved into another drive or not.

If the file of one of the drives in the hard disk drive can be moved into another drive, the power-saving control unit 181 moves the file of the one of the drives into a drive containing a file which is often accessed, removes the drive containing the frequently accessed file out of the power-saving control subjects, and then performs the power-saving control such as suspending or cutting off power in step S22-4.

If no file can be moved from one drive to another, the power-saving control unit 181 performs the power-saving control for all the drives in step S22-5.

FIG. 41 is a flowchart of the file moving operation of step S22-4.

In step S23-1, the power-saving control unit 181 obtains client LOG information and the size of each file from the client LOG information storage area 182, and extracts a frequently accessed file and a frequently accessed drive in accordance with the client LOG information. In step S23-2, the power-saving control unit 181 moves the frequently accessed file into the frequently accessed drive. In step S23-3, the power-saving control unit 181 modifies the drive and path name information 172 of the drive from which the frequently accessed file is moved, to the drive and path name of the drive into which the frequently accessed file is moved. In step S23-4, the power-saving control unit 181 performs the power-saving control for the drive from which the frequently accessed file is moved.

Figure 42:
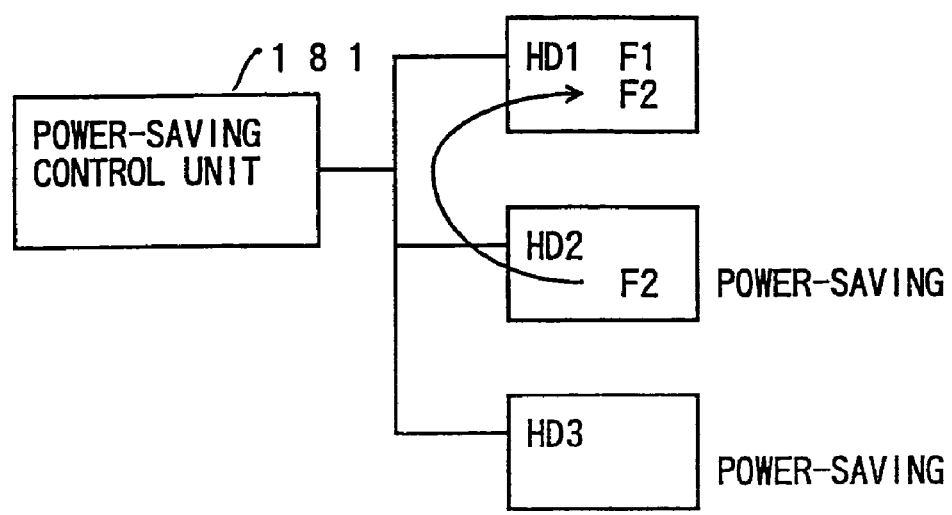
FIG. 42 shows the file moving operation of the server power-saving control unit of the server.

FIG. 42 shows a file moving operation of the power-saving control unit 181.

As shown in FIG. 42, the server 2 includes three hard disk drives hd1, hd2, and hd3. If the frequency of accesses to the hard disk drive hd3 is lower than a predetermined frequency, the hard disk drive hd3 remains subjected to the power-saving control. If the frequencies of accesses to the files F1 and F2 of the hard disk drives hd1 and hd2 are higher than the predetermined frequency, the file F2 of the hard disk drive hd2 is moved into the hard disk drive hd1. The hard disk drive hd1 is then removed from a group of drives subjected to the power-saving control, and the hard disk drive hd2 is subjected to the power-saving control.

In this manner, the frequently accessed files can be thus gathered in one drive, and the other drives can be stopped. Thus, the power-saving control can be effectively performed.

Although the above power-saving control is performed in accordance with the client LOG information storage area 182 shown in FIG. 37, it is possible to carry out the power-saving control in accordance with the client LOG information tabulation area 183 shown in FIGS. 38A and 38B.

Figure 43A:
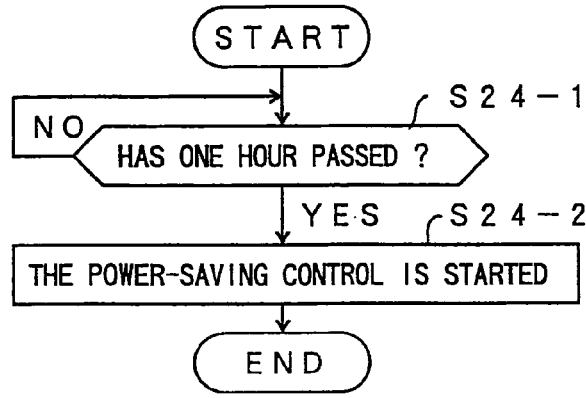
FIGS. 43A to 43C are flowcharts of an operation of creating the client LOG information tabulation area of FIGS. 38A and 38B.
Figure 43B:
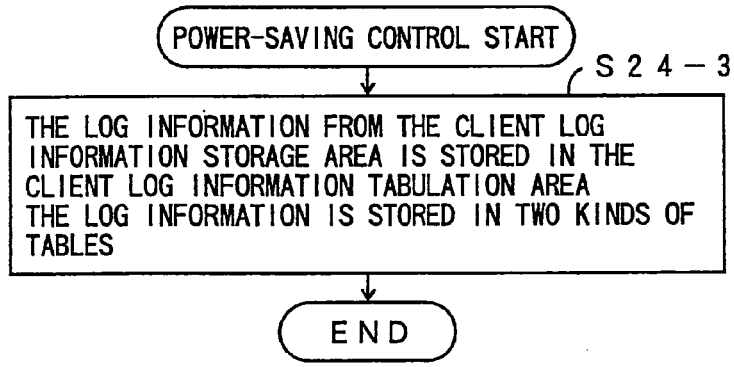
Figure 43C:
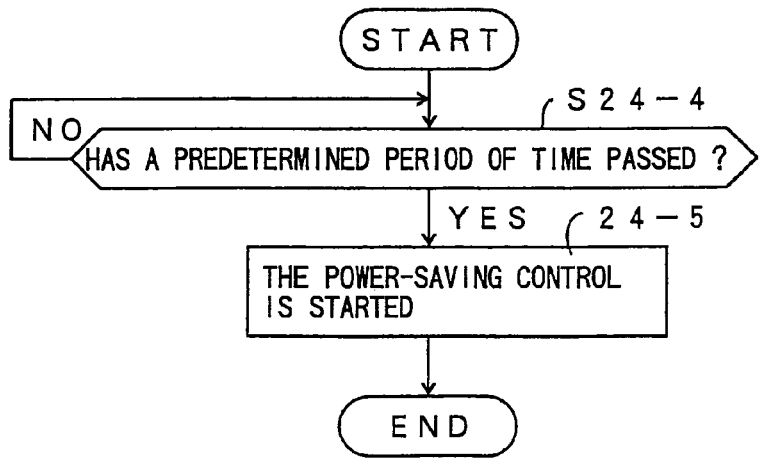

FIGS. 43A to 43C are flowcharts of an operation of creating the client LOG information tabulation area 183 shown in FIGS. 38A and 38B.

In step S24-1 in FIG. 43A, the power-saving control unit 181 judges whether one hour has passed or not. If one hour has passed, the power-saving control unit 181 generates a timer interrupt to start the power-saving control in step S24-2.

In step S24-3 in FIG. 43B, the power-saving control unit 181 updates the information tabulation shown in FIGS. 38A and 38B in accordance with the client LOG information storage area 182.

In step 24-4 shown in FIG. 43C, the power-saving control unit 181 judges whether a predetermined period of time, which is longer than one hour, has passed or not. In step S24-5, the power-saving control unit 181 performs the power-saving control in accordance with the client LOG information tabulation updated in step S24-3 shown in FIG. 43B.

Figure 44:
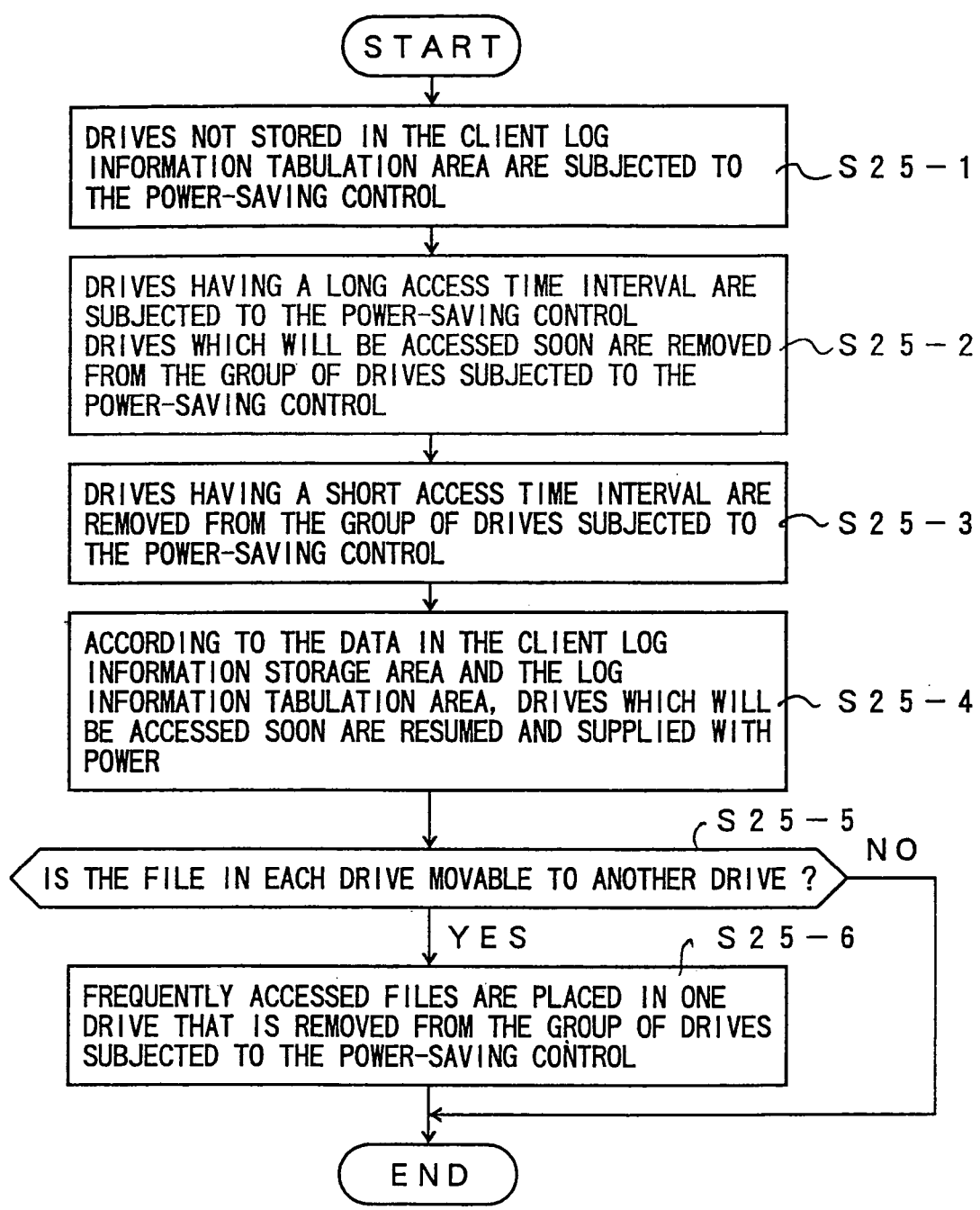
FIG. 44 is a flowchart of a server power-saving control operation of the server.

FIG. 44 is a flowchart of a server power-saving control operation of the server 2.

In step 25-1, the power-saving control unit 181 detects which drives are not stored in the client LOG information tabulation area 183, and subjects the detected drives to the power-saving control.

In step S25-2, the power-saving control unit 181 detects which drives in the client LOG information tabulation area 183 have an access time interval 202 longer than a predetermined period of time, and subjects the detected drives to the power-saving control. Here, the power-saving control unit 181 refers to the client LOG information storage area 182 shown in FIG. 37. If the time obtained by adding the access time interval 202 in the client LOG information tabulation area 183 to the previous access time is within a predetermined period from the current time, the power-saving control unit 181 judges that an access will be made soon. Thus, the corresponding drive is not subjected to the power-saving control.

In step S25-3, the power-saving control unit 181 detects which drives have an access time interval 202 shorter than a predetermined period of time, and removes the detected drives from the group of drives subjected to the power-saving control. Thus, the drives to be subjected to the power-saving control can be determined.

The power-saving control unit 181 also detects which drives among the drives to be subjected to the power-saving control have the time obtained by adding the access time interval 202 to the previous access time within a predetermined period from the current time. In step S25-4, the power-saving control unit 181 resumes and supplies power to such drives to prepare for a next access from the client 3-$i$.

In step S25-5, the power-saving control unit 181 judges whether the file of each drive is movable to another drive. If the file of each drive is movable to another drove, a drive having a frequently accessed file is removed from the group of drives subjected to the power-saving control in step S25-6.

In the above manner, the power-saving control can be performed for the hard disk drive 25 or the printer 26 in response to an access from the client 3-i. Thus, the power-saving control can be performed not only for the client 3-i but also for the server 2, thereby achieving an effective power-saving control system.

The present invention is not limited to the specifically disclosed embodiments, but variations and modifications may be made without departing from the scope of the present invention.

The present application is based on Japanese priority application No. 11-67389, filed on Mar. 12, 1999, the entire contents of which are hereby incorporated for reference.

What is claimed is:

1. A method of controlling power consumption of a management apparatus to which an electronic apparatus is connected via a network, the management apparatus having at least two common storage devices that are shared with the electronic apparatus, said method comprising:
   detecting an accessed state to a first common storage device by the electronic apparatus;
   moving files contained in the first common storage device to a second common storage device based on the detected accessed state of the first common storage device, to gather together files accessed a predetermined number of times onto the second common storage device; and
   controlling an operational state of the first common storage device as a result of said moving of files, to thereby reduce power consumption by the management apparatus, wherein
   the number file accesses for the files in the first common storage device is recorded as an entry in a log file, and
   a file is moved from the first common storage device to the second common storage device if the respective log entry for the file is at least the predetermined number of times.

2. A management apparatus having at least two common storage devices shared with an electronic apparatus, wherein said management apparatus comprises:
   a status detecting unit which detects an accessed state to a first common storage device by the electronic apparatus; and
   a shared device control unit which controls an operational state of the first common storage device, by moving files contained in the first common storage device to a second common storage device, in accordance with the accessed state of the first common storage device detected by the status detecting unit, to gather together files accessed a predetermined number of times onto the second common storage device, wherein
   the number file accesses for the files in the first common storage device is recorded as an entry in a log file, and
   a file is moved from the first common storage device to the second common storage device if the respective log entry for the file is at least the predetermined number of times.

3. A computer-readable recording medium storing a program to be executed by a management apparatus to control an electronic apparatus connected thereto via a network, the management apparatus having at least two common storage devices that are shared with the electronic apparatus, the program executing a process comprising:
   detecting an accessed state to a first common storage device by the electronic apparatus;
   moving files contained in the first common storage device to a second common storage device based on the detected accessed state of the first common storage device, to gather together files accessed a predetermined number of times onto the second common storage device; and
   controlling an operational state of the first common storage device as a result of said moving of files, to thereby reduce power consumption by the management apparatus, wherein
   the number file accesses for the files in the first common storage device is recorded as an entry in a log file, and
   a file is moved from the first common storage device to the second common storage device if the respective log entry for the file is at least the predetermined number of times.

4. The recording medium as claimed in claim 3, wherein the program comprises:
   a usage frequency detecting procedure for detecting how often the first and second common storage devices are used by the electronic apparatus; and
   a common device control procedure for controlling an operation of one or both of the first and second common storage devices in accordance with the detected usage frequency.

5. A method of controlling power consumption of a management apparatus having at least two common storage devices that are shared with an electronic apparatus, said method comprising:
   moving files contained in a first common storage device to a second common storage device based on an accessed state of the first common storage device, to gather together files accessed a predetermined number of times onto the second common storage device; and
   controlling an operational state of the first common storage device as a result of said moving of files, to thereby reduce power consumption by the management apparatus, wherein
   the number file accesses for the files in the first common storage device is recorded as an entry in a log file, and
   a file is moved from the first common storage device to the second common storage device if the respective log entry for the file is at least the predetermined number of times.

* * * * *

UNITED STATES PATENT AND TRADEMARK OFFICE
CERTIFICATE OF CORRECTION

PATENT NO. : 7,461,278 B2  Page 1 of 1
APPLICATION NO. : 10/667790
DATED : December 2, 2008
INVENTOR(S) : Yoshifusa Togawa It is certified that error appears in the above-identified patent and that said Letters Patent is hereby corrected as shown below:

Title Page 1, Column 1, under
"Prior Publication Data
US 2005/0204176 A1  Sep. 15, 2005"

insert

-- Related U.S. Application Data
(62) Divisional of Application No. 09/501,718, filed Feb. 10, 2000, now Pat. No. 6,715,088.

(30) Foreign Application Priority Data
Mar. 12, 1999  (JP) ..................... 11-067389 --.

Signed and Sealed this

Eighth Day of June, 2010

David J. Kappos
*Director of the United States Patent and Trademark Office*